US012197155B2

(12) United States Patent
Yoshinaga et al.

(10) Patent No.: US 12,197,155 B2
(45) Date of Patent: Jan. 14, 2025

(54) HEATING DEVICE, FIXING DEVICE, AND IMAGE FORMING APPARATUS WITH HEAT SHIELD INCLUDING FIRST PORTION AND SECOND PORTION

(71) Applicants: Hiroshi Yoshinaga, Chiba (JP); Takayuki Andoh, Kanagawa (JP); Masahiro Samei, Kanagawa (JP); Kota Shiodera, Tokyo (JP); Toshiyuki Kabata, Kanagawa (JP); Ryohhei Sugiyama, Kanagawa (JP)

(72) Inventors: Hiroshi Yoshinaga, Chiba (JP); Takayuki Andoh, Kanagawa (JP); Masahiro Samei, Kanagawa (JP); Kota Shiodera, Tokyo (JP); Toshiyuki Kabata, Kanagawa (JP); Ryohhei Sugiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/207,153

(22) Filed: Jun. 8, 2023

(65) Prior Publication Data

US 2024/0004329 A1 Jan. 4, 2024

(30) Foreign Application Priority Data

Jun. 30, 2022 (JP) ................................ 2022-106322

(51) Int. Cl.
*G03G 15/20* (2006.01)

(52) U.S. Cl.
CPC ..... *G03G 15/2053* (2013.01); *G03G 15/2017* (2013.01); *G03G 15/2046* (2013.01); *G03G 15/2064* (2013.01); *G03G 2215/2035* (2013.01)

(58) Field of Classification Search
CPC ............... G03G 15/2053; G03G 15/20; G03G 15/2064; G03G 15/2017; G03G 15/2046; G03G 2215/2035
See application file for complete search history.

(56) References Cited

U.S. PATENT DOCUMENTS 4,580,033 A * 4/1986 Sakurai .............. G03G 15/2053 399/334
2007/0196152 A1 8/2007 Shimizu et al.
(Continued)

FOREIGN PATENT DOCUMENTS

JP 2013-164453 8/2013
JP 2018-084738 5/2018

OTHER PUBLICATIONS

U.S. Appl. No. 18/160,080, filed Jan. 26, 2023, Daisuke Inoue, et al.
(Continued)

*Primary Examiner* — Arlene Heredia
*Assistant Examiner* — Laura Roth
(74) *Attorney, Agent, or Firm* — XSENSUS LLP

(57) ABSTRACT

A heating device includes a rotator that rotates and a heater that is disposed opposite an inner circumferential face of the rotator. The heater heats the rotator. A rotator holder is disposed opposite the inner circumferential face of the rotator. The rotator holder holds a lateral end of the rotator in a longitudinal direction of the rotator. The rotator holder is adhered with a lubricating substance. A heat shield is disposed between the heater and the rotator and between the heater and the rotator holder. The heat shield blocks radiant heat radiated from the heater and is separated from the rotator holder. The heat shield includes a first portion and a second portion that is disposed outboard from the first portion in the longitudinal direction of the rotator. The
(Continued)

second portion is separated from the inner circumferential face of the rotator farther than the first portion is.

17 Claims, 13 Drawing Sheets

(56) References Cited

U.S. PATENT DOCUMENTS

| | | | | |
|---|---|---|---|---|
| 2009/0041515 | A1* | 2/2009 | Kim | G03G 15/2025 399/324 |
| 2011/0044734 | A1 | 2/2011 | Shimokawa et al. | |
| 2011/0052245 | A1 | 3/2011 | Shinshi et al. | |
| 2011/0064437 | A1 | 3/2011 | Yamashina et al. | |
| 2011/0222875 | A1 | 9/2011 | Imada et al. | |
| 2011/0222888 | A1 | 9/2011 | Ikebuchi et al. | |
| 2011/0222931 | A1 | 9/2011 | Shinshi et al. | |
| 2011/0274453 | A1 | 11/2011 | Shimokawa et al. | |
| 2012/0177388 | A1 | 7/2012 | Imada et al. | |
| 2013/0045032 | A1 | 2/2013 | Shimokawa et al. | |
| 2013/0164056 | A1 | 6/2013 | Imada et al. | |
| 2013/0195523 | A1 | 8/2013 | Yamaji et al. | |
| 2013/0209147 | A1 | 8/2013 | Ogawa et al. | |
| 2013/0322937 | A1* | 12/2013 | Suzuki | G03G 15/2003 399/329 |
| 2014/0341624 | A1* | 11/2014 | Arai | G03G 15/2053 399/329 |
| 2014/0341627 | A1 | 11/2014 | Yoshikawa et al. | |
| 2017/0185015 | A1 | 6/2017 | Yoshinaga et al. | |
| 2018/0024462 | A1 | 1/2018 | Shimada et al. | |
| 2018/0259888 | A1* | 9/2018 | Mitsui | G03G 15/2025 |
| 2018/0267449 | A1 | 9/2018 | Naitoh et al. | |
| 2020/0050144 | A1 | 2/2020 | Kabata et al. | |
| 2022/0026834 | A1 | 1/2022 | Yoshinaga | |
| 2023/0063831 | A1 | 3/2023 | Sugiyama | |

OTHER PUBLICATIONS

U.S. Appl. No. 18/179,552, filed Mar. 7, 2023, Takayuki Andoh, et al.

U.S. Appl. No. 18/176,845, filed Mar. 1, 2023, Ryohhei Sugiyama, et al.

U.S. Appl. No. 18/163,591, filed Feb. 2, 2023, Takayuki Andoh, et al.

U.S. Appl. No. 18/180,509, filed Mar. 8, 2023, Kota Shiodera, et al.

U.S. Appl. No. 18/185,778, filed Mar. 17, 2023, Masahiro Samei, et al.

U.S. Appl. No. 18/162,872, filed Feb. 1, 2023, Hiroshi Yoshinaga, et al.

* cited by examiner

APPROVED: /LKR/

HEATING DEVICE, FIXING DEVICE, AND IMAGE FORMING APPARATUS WITH HEAT SHIELD INCLUDING FIRST PORTION AND SECOND PORTION

CROSS-REFERENCE TO RELATED APPLICATION

This patent application is based on and claims priority pursuant to 35 U.S.C. § 119(a) to Japanese Patent Application No. 2022-106322, filed on Jun. 30, 2022, in the Japan Patent Office, the entire disclosure of which is hereby incorporated by reference herein.

BACKGROUND

Technical Field

Embodiments of this disclosure relate to a heating device, a fixing device, and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses are installed with a heating device. As one example, the heating device is a fixing device that heats a recording medium such as a sheet to fix an unfixed image on the recording medium.

SUMMARY

This specification describes below an improved heating device. In one embodiment, the heating device includes a rotator that rotates and a heater that is disposed opposite an inner circumferential face of the rotator. The heater heats the rotator. A rotator holder is disposed opposite the inner circumferential face of the rotator. The rotator holder holds a lateral end of the rotator in a longitudinal direction of the rotator. The rotator holder is adhered with a lubricating substance. A heat shield is disposed between the heater and the rotator and between the heater and the rotator holder. The heat shield blocks radiant heat radiated from the heater and is separated from the rotator holder. The heat shield includes a first portion and a second portion that is disposed outboard from the first portion in the longitudinal direction of the rotator. The second portion is separated from the inner circumferential face of the rotator farther than the first portion is.

This specification further describes an improved fixing device. In one embodiment, the fixing device includes a first rotator that rotates and a second rotator that is disposed opposite the first rotator. A heater is disposed opposite an inner circumferential face of the first rotator. The heater heats the first rotator. A rotator holder is disposed opposite the inner circumferential face of the first rotator. The rotator holder holds a lateral end of the first rotator in a longitudinal direction of the first rotator. The rotator holder is adhered with a lubricating substance. A heat shield is disposed between the heater and the first rotator and between the heater and the rotator holder. The heat shield blocks radiant heat radiated from the heater and is separated from the rotator holder. The heat shield includes a first portion and a second portion that is disposed outboard from the first portion in the longitudinal direction of the first rotator. The second portion is separated from the inner circumferential face of the first rotator farther than the first portion is.

This specification further describes an improved image forming apparatus. In one embodiment, the image forming apparatus includes an image bearer that bears an image and the heating device described above that heats the image on a recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
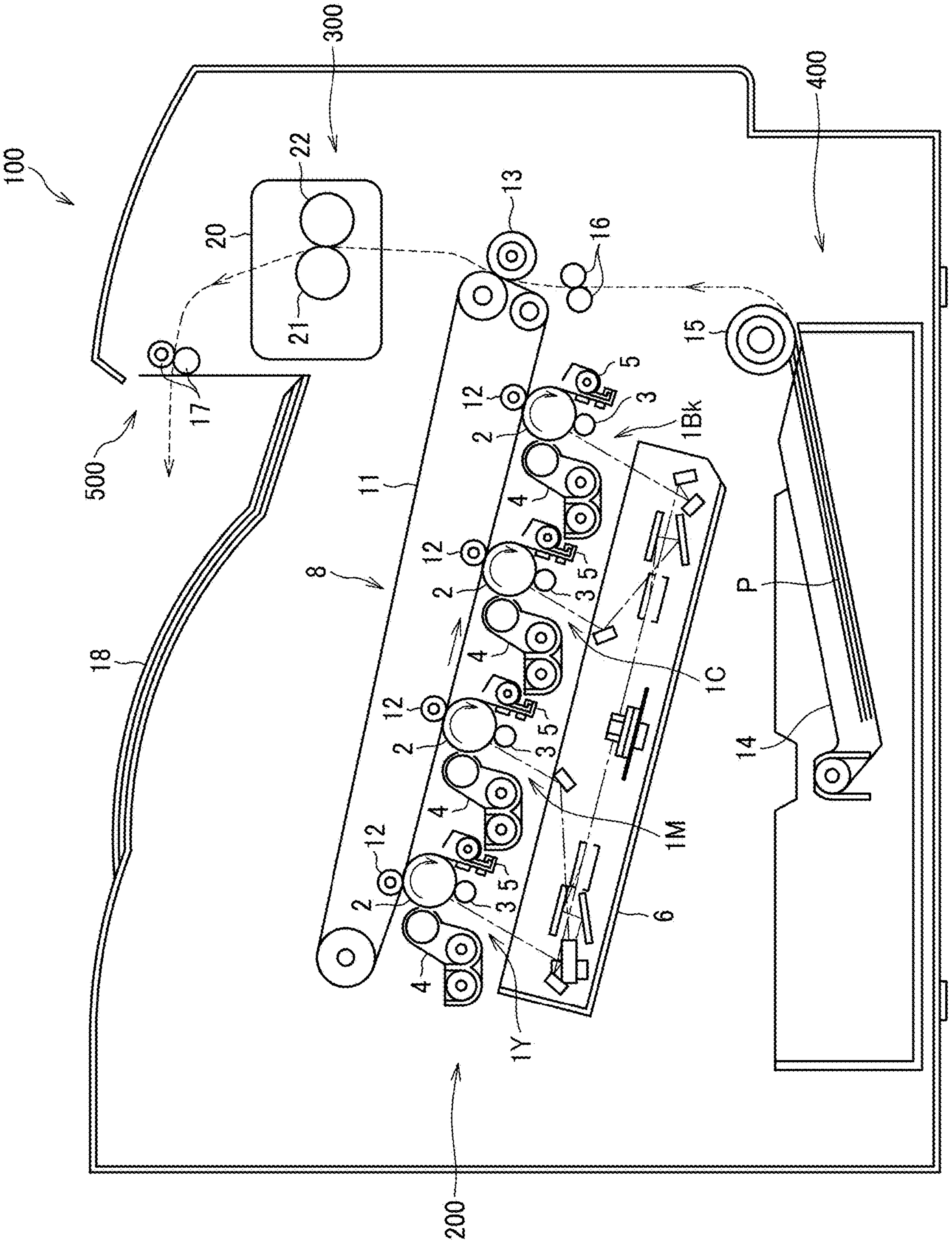
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to attached drawings, the following describes embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

FIG. 1 is a schematic cross-sectional view of an image forming apparatus 100 according to an embodiment of the present disclosure. The image forming apparatus 100 is a printer. Alternatively, the image forming apparatus 100 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns.

Referring to FIG. 1, a description is provided of an overall construction and operation of the image forming apparatus 100 according to an embodiment of the present disclosure.

As illustrated in FIG. 1, the image forming apparatus 100 according to the embodiment includes an image forming portion 200, a fixing portion 300, a recording medium supply portion 400, and a recording medium ejecting portion 500. The image forming portion 200 forms a toner image on a sheet P serving as a recording medium. The fixing portion 300 fixes the toner image on the sheet P. The recording medium supply portion 400 supplies the sheet P to the image forming portion 200. The recording medium ejecting portion 500 ejects the sheet P onto an outside of the image forming apparatus 100.

The image forming portion 200 includes four process units 1Y, 1M, 1C, and 1Bk, an exposure device 6, and a transfer device 8. The process units 1Y, 1M, 1C, and 1Bk serve as image forming units or image forming devices, respectively. The exposure device 6 forms an electrostatic latent image on a photoconductor 2 of each of the process units 1Y, 1M, 1C, and 1Bk. The transfer device 8 transfers the toner image onto the sheet P.

The process units 1Y, 1M, 1C, and 1Bk basically have similar constructions, respectively. However, the process units 1Y, 1M, 1C, and 1Bk contain toners, serving as developers, in different colors, that is, yellow, magenta, cyan, and black, respectively, which correspond to color separation components for a color image. For example, each of the process units 1Y, 1M, 1C, and 1Bk includes the photoconductor 2, a charger 3, a developing device 4, and a cleaner 5. The photoconductor 2 serves as an image bearer that bears an image (e.g., an electrostatic latent image and a toner image) on a surface of the photoconductor 2. The charger 3 charges the surface of the photoconductor 2. The developing device 4 supplies the toner as the developer to the surface of the photoconductor 2 to form a toner image. The cleaner 5 cleans the surface of the photoconductor 2.

The transfer device 8 includes an intermediate transfer belt 11, primary transfer rollers 12, and a secondary transfer roller 13. The intermediate transfer belt 11 is an endless belt that is stretched taut across a plurality of support rollers. The four primary transfer rollers 12 are disposed within a loop formed by the intermediate transfer belt 11. The primary transfer rollers 12 are pressed against the photoconductors 2, respectively, via the intermediate transfer belt 11, thus forming primary transfer nips between the intermediate transfer belt 11 and the photoconductors 2. The secondary transfer roller 13 contacts an outer circumferential surface of the intermediate transfer belt 11 to form a secondary transfer nip therebetween.

The fixing portion 300 includes a fixing device 20 serving as a heating device that heats the sheet P transferred with the toner image. The fixing device 20 includes a fixing belt 21 and a pressure roller 22. The fixing belt 21 heats the toner image on the sheet P. The pressure roller 22 contacts the fixing belt 21 to form a nip (e.g., a fixing nip) therebetween.

The recording medium supply portion 400 includes a sheet tray 14 (e.g., a paper tray) and a feed roller 15. The sheet tray 14 loads a plurality of sheets P serving as recording media. The feed roller 15 picks up and feeds a sheet P from the sheet tray 14. According to the embodiments below, a sheet (e.g., a sheet P) is used as a recording medium. However, the recording medium is not limited to paper as the sheet. In addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

The recording medium ejecting portion 500 includes an output roller pair 17 and an output tray 18. The output roller pair 17 ejects the sheet P onto the outside of the image forming apparatus 100. The output tray 18 is placed with the sheet P ejected by the output roller pair 17. The image forming apparatus 100 further includes a timing roller pair 16.

Referring to FIG. 1, a description is provided of printing processes performed by the image forming apparatus 100 according to the embodiment.

When the image forming apparatus 100 receives an instruction to start printing, a driver starts driving and rotating the photoconductor 2 of each of the process units 1Y, 1M, 1C, and 1Bk clockwise in FIG. 1 and the intermediate transfer belt 11 of the transfer device 8 counterclockwise in FIG. 1. The feed roller 15 starts rotation, feeding a sheet P from the sheet tray 14. As the sheet P fed by the feed roller 15 comes into contact with the timing roller pair 16, the timing roller pair 16 temporarily halts the sheet P. Thus, the timing roller pair 16 temporarily interrupts conveyance of the sheet P until the toner image, that is to be transferred onto the sheet P, is formed on the intermediate transfer belt 11.

The charger 3 of each of the process units 1Y, 1M, 1C, and 1Bk charges the surface of the photoconductor 2 evenly at a high electric potential. The exposure device 6 exposes the charged surfaces of the photoconductors 2, respectively, according to image data (e.g., print data) sent from a terminal. Alternatively, if the image forming apparatus 100 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the process units 1Y, 1M, 1C, and 1Bk supplies toner to the electrostatic latent image formed on the photoconductor 2, forming a toner image thereon. When the toner images formed on the photoconductors 2 reach the primary transfer nips defined by the primary transfer rollers 12 in accordance with rotation of the photoconductors 2, respectively, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11. Thus, the superimposed toner images form a full color toner image on the intermediate transfer belt 11. Alternatively, one of the four process units 1Y, 1M, 1C, and 1Bk may be used to form a monochrome toner image or two or three of the four process units 1Y, 1M, 1C, and 1Bk may be used to form a bicolor toner image or a tricolor toner image. After the toner image formed on the photoconductor 2 is transferred onto the intermediate transfer belt 11, the cleaner 5 removes residual toner and the like remaining on the photoconductor 2 therefrom.

The full color toner image formed on the intermediate transfer belt 11 is conveyed to the secondary transfer nip defined by the secondary transfer roller 13 in accordance with rotation of the intermediate transfer belt 11 and is transferred onto the sheet P conveyed by the timing roller pair 16. Thereafter, the sheet P transferred with the full color toner image is conveyed to the fixing device 20 where the fixing belt 21 and the pressure roller 22 fix the full color toner image on the sheet P under heat and pressure. The sheet P is conveyed to the recording medium ejecting portion 500 where the output roller pair 17 ejects the sheet P onto the output tray 18. Thus, a series of printing processes is finished.

Figure 2:
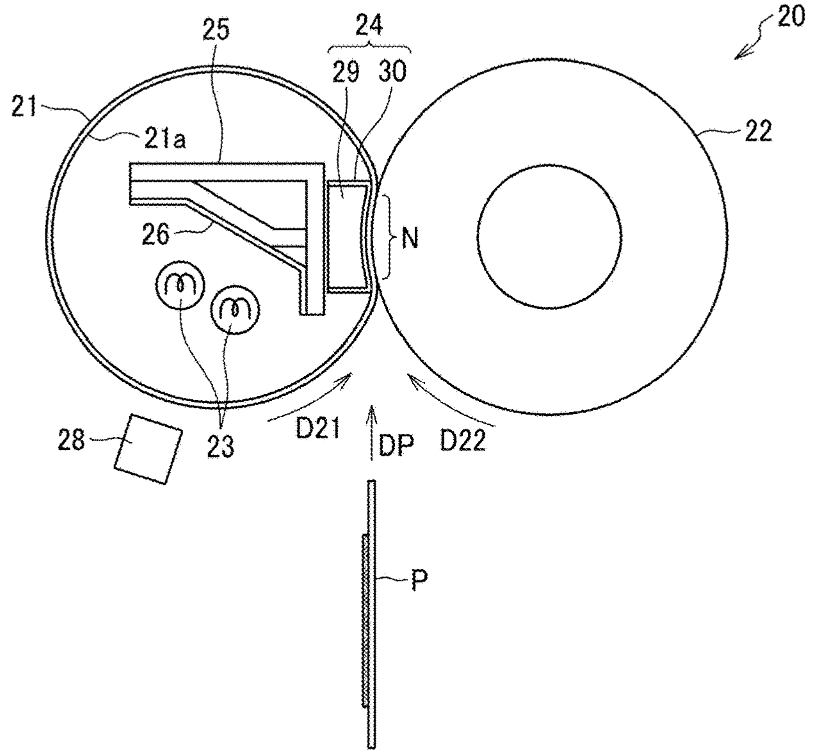
FIG. 2 is a cross-sectional view of a fixing device according to a first embodiment of the present disclosure, that is incorporated in the image forming apparatus depicted in FIG. 1, illustrating a cross section at a center of the fixing device in a longitudinal direction thereof.
Figure 3:
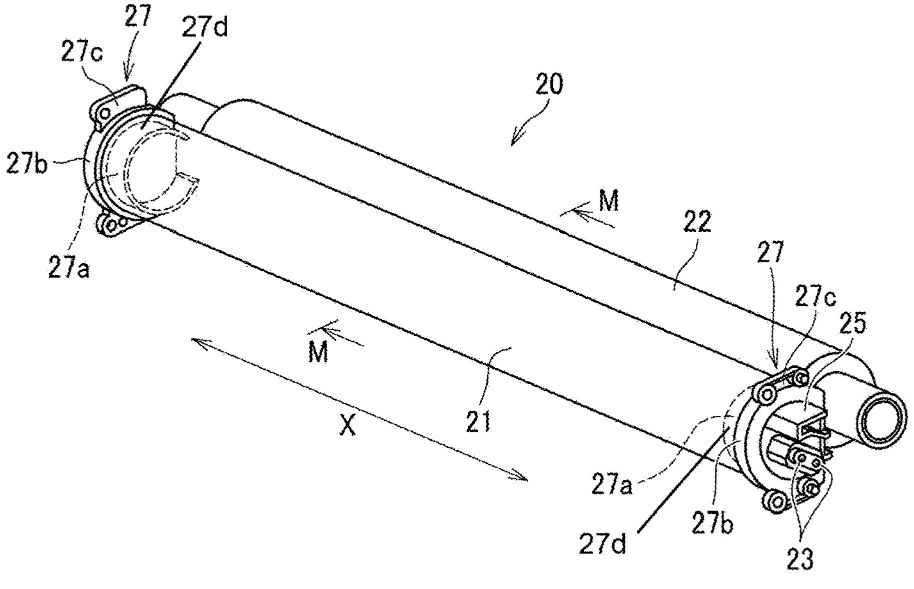
FIG. 3 is a perspective view of the fixing device depicted in FIG. 2.

Referring to FIGS. 2 and 3, a description is provided of a basic construction of the fixing device 20 according to an embodiment of the present disclosure.

FIG. 2 is a center cross-sectional view of the fixing device 20 according to the embodiment, taken on a center M depicted in FIG. 3 of the fixing belt 21 in a longitudinal direction thereof. The longitudinal direction of the fixing belt 21 denotes a longitudinal direction X depicted in FIG. 3 and is parallel to an axial direction of the pressure roller 22 or a width direction of the sheet P passing through a fixing nip N formed between the fixing belt 21 and the pressure roller 22. The width direction of the sheet P is perpendicular to a sheet conveyance direction DP in which the sheet P is conveyed. A longitudinal direction described below is also defined as described above.

As illustrated in FIGS. 2 and 3, in addition to the fixing belt 21 and the pressure roller 22, the fixing device 20 according to the embodiment includes halogen heaters 23, a nip formation pad 24, a stay 25, a reflector 26 depicted in FIG. 2, belt holders 27 depicted in FIG. 3, and a temperature sensor 28 depicted in FIG. 2.

The fixing belt 21 serves as a rotator (e.g., a first rotator or a fixing rotator) that contacts an unfixed toner image bearing side of a sheet P, which bears an unfixed toner image, and fixes the unfixed toner image (e.g., unfixed toner) on the sheet P. The fixing belt 21 rotates in a rotation direction D21.

For example, the fixing belt 21 is an endless belt that includes a base layer serving as an inner circumferential surface layer, an elastic layer being disposed on the base layer, and a release layer being disposed on the elastic layer and serving as an outer circumferential surface layer. The base layer has a layer thickness in a range of from 30 μm to 50 μm and is made of a metal material such as nickel and stainless steel or a resin material such as polyimide. The elastic layer has a layer thickness in a range of from 100 μm to 300 μm and is made of a rubber material such as silicone rubber, silicone rubber foam, and fluororubber. Since the fixing belt 21 incorporates the elastic layer, the elastic layer prevents slight surface asperities from being produced on a surface of the fixing belt 21 at the fixing nip N. Accordingly, heat is quickly conducted from the fixing belt 21 to the toner image on the sheet P evenly. The release layer has a layer thickness in a range of from 10 μm to 50 μm. The release layer is made of perfluoroalkoxy alkane (PFA), polytetrafluoroethylene (PTFE), polyimide, polyether imide, polyether sulfone (PES), or the like. As the fixing belt 21 incorporates the release layer, the release layer facilitates separation and peeling of toner of the toner image formed on the sheet P from the fixing belt 21. In order to decrease the size and the thermal capacity of the fixing belt 21, the fixing belt 21 preferably has a total thickness not greater than 1 mm and a diameter not greater than 30 mm.

The pressure roller 22 serves as a rotator (e.g., a second rotator or an opposed rotator) that is disposed opposite an outer circumferential face of the fixing belt 21. The pressure roller 22 rotates in a rotation direction D22.

For example, the pressure roller 22 includes a core metal that is solid and made of iron, an elastic layer that is disposed on an outer circumferential face of the core metal, and a release layer that is disposed on an outer circumferential face of the elastic layer. Alternatively, the core metal may be hollow. The elastic layer is made of silicone rubber, silicone rubber foam, fluororubber, or the like. The release layer is made of fluororesin such as PFA and PTFE.

Each of the halogen heaters 23 serves as a heater that emits radiant heat (e.g., infrared light), heating the fixing belt 21. Alternatively, as a heater that heats the fixing belt 21 with radiant heat, a carbon heater, a ceramic heater, or the like may be employed instead of a halogen heater. The halogen heaters 23 are disposed within a loop formed by the fixing belt 21. The halogen heaters 23 do not contact an inner circumferential face 21*a* of the fixing belt 21. Each of the halogen heaters 23 is secured to and supported by a pair of side plates or the like of the fixing device 20. According to the embodiment, the two halogen heaters 23 are disposed within the loop formed by the fixing belt 21 and disposed opposite the inner circumferential face 21*a* of the fixing belt 21. Alternatively, the fixing device 20 may incorporate a single halogen heater 23 or three or more halogen heaters 23.

The nip formation pad 24 is disposed within the loop formed by the fixing belt 21. The nip formation pad 24 is disposed opposite the pressure roller 22 via the fixing belt 21, forming the fixing nip N between the fixing belt 21 and the pressure roller 22. The nip formation pad 24 includes a base pad 29 and a slide sheet 30.

The base pad 29 extends continuously in the longitudinal direction X of the fixing belt 21 and is secured to the stay 25. The base pad 29 receives pressure from the pressure roller 22, defining a shape of the fixing nip N. The base pad 29 is preferably made of a heat-resistant material that has a heat-resistant temperature of 200 degrees Celsius or higher. For example, the base pad 29 is made of general heat-resistant resin such as polyether sulfone (PES), polyphenylene sulfide (PPS), liquid crystal polymer (LCP), polyether nitrile (PEN), polyamide imide (PAI), and polyether ether ketone (PEEK). As the base pad 29 is made of the heat-resistant material described above, the base pad 29 is immune from thermal deformation in a fixing temperature range, stabilizing the shape of the fixing nip N. As illustrated in FIG. 2, the fixing nip N is recessed or curved. Alternatively, the fixing nip N may be planar or may have other shapes.

The slide sheet 30 is interposed between the base pad 29 and the inner circumferential face 21*a* of the fixing belt 21 and is made of a low friction material. Since the slide sheet 30 is interposed between the base pad 29 and the fixing belt 21, the slide sheet 30 decreases sliding friction with which the fixing belt 21 slides over the base pad 29 via the slide sheet 30. If the base pad 29 is made of the low friction material, the nip formation pad 24 may not incorporate the slide sheet 30.

The stay 25 serves as a support that contacts a stay opposed face of the nip formation pad 24, that is opposite to a pressure roller opposed face of the nip formation pad 24, that is disposed opposite the pressure roller 22, thus supporting the nip formation pad 24. As the stay 25 supports the nip formation pad 24, the stay 25 suppresses a bend of the nip formation pad 24 by pressure from the pressure roller 22. For example, the stay 25 suppresses a bend of the nip formation pad 24 throughout an entire span of the nip formation pad 24 in the longitudinal direction X of the fixing belt 21. Thus, the stay 25 causes the nip formation pad 24 to form the fixing nip N that has an even width in the sheet conveyance direction DP throughout an entire span of the fixing belt 21 in the longitudinal direction X thereof. The stay 25 is preferably made of a ferrous metal material such as stainless used steel (SUS) and steel electrolytic cold commercial (SECC) to achieve rigidity.

The reflector 26 reflects radiant heat (e.g., infrared light) radiated from the halogen heaters 23. The reflector 26 reflects radiant heat emitted by the halogen heaters 23 toward the fixing belt 21, facilitating heating of the fixing belt 21. The reflector 26 is interposed between the stay 25 and the halogen heaters 23, thus also suppressing conduction of heat from the halogen heaters 23 to the stay 25. Accordingly, the reflector 26 suppresses conduction of heat to an element that does not directly contribute to fixing of the toner image on the sheet P, saving energy. The reflector 26 is made of metal such as aluminum and stainless steel. For example, if the reflector 26 is constructed of a base layer made of aluminum and coated with silver having an enhanced reflectance by vapor deposition, the reflector 26 improves efficiency in heating the fixing belt 21 further.

The belt holders 27 serve as a pair of rotator holders that rotatably holds or supports the fixing belt 21. As illustrated in FIG. 3, the belt holders 27 are inserted into an interior within the loop formed by the fixing belt 21 at both lateral ends of the fixing belt 21 in the longitudinal direction X thereof, respectively. The belt holders 27 contact the inner circumferential face 21*a* of the fixing belt 21, rotatably holding the fixing belt 21. In the present disclosure, both lateral ends and a lateral end of the fixing belt 21 in the longitudinal direction X thereof are not limited to both outermost lateral edge portions and an outermost lateral edge portion of the fixing belt 21 in the longitudinal direction X thereof, respectively. In addition to both outermost lateral edge portions and the outermost lateral edge portion of the fixing belt 21 in the longitudinal direction X thereof, both lateral ends and the lateral end of the fixing belt 21 in the longitudinal direction X thereof also denote an arbitrary position within a span having a length (e.g., a one-third length) from a lateral edge to a divided position on the fixing belt 21 in the longitudinal direction X thereof when the fixing belt 21 is divided into three equal parts in the longitudinal direction X thereof. Accordingly, the belt holder 27 holds or supports a region (e.g., the lateral end of the fixing belt 21) encompassing the outermost lateral edge portion of the fixing belt 21 in the longitudinal direction X thereof. Additionally, the belt holder 27 may hold or support a region (e.g., the lateral end of the fixing belt 21) not encompassing the lateral edge portion (e.g., the outermost lateral edge portion) of the fixing belt 21 in the longitudinal direction X thereof.

Figure 4:
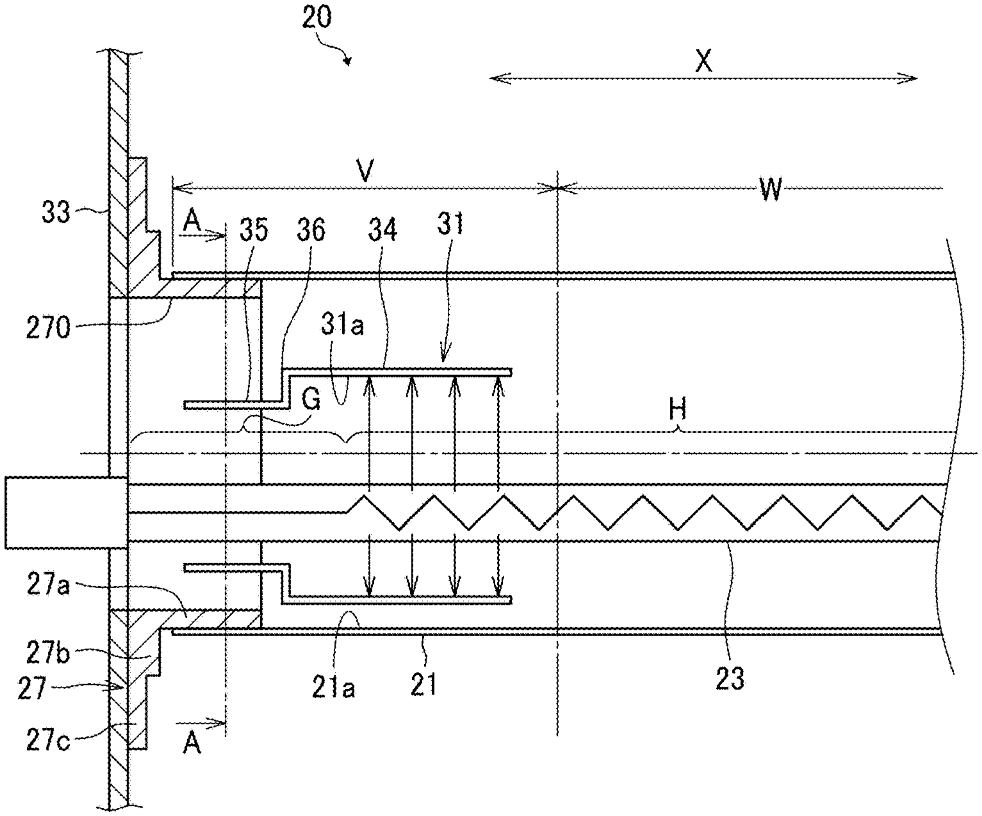
FIG. 4 is a cross-sectional view of the fixing device depicted in FIG. 3, illustrating a lateral end span of a fixing belt incorporated in the fixing device in a longitudinal direction of the fixing belt.

For example, the belt holder 27 includes an insertion portion 27*a*, a restricting portion 27*b*, and a secured portion 27*c*. The insertion portion 27*a* is C-shaped in cross section and is inserted into the interior within the loop formed by the fixing belt 21 at the lateral end of the fixing belt 21 in the longitudinal direction X thereof. The restricting portion 27*b* has an outer diameter that is greater than an outer diameter of the insertion portion 27*a*. As illustrated in FIG. 4, the secured portion 27*c* is secured to a side plate 33 of the fixing device 20. The restricting portion 27*b* has an outer diameter that is greater than at least an outer diameter of the fixing belt 21. If the fixing belt 21 is skewed or moved in the longitudinal direction X thereof, the restricting portion 27*b* restricts skew or motion of the fixing belt 21. As the insertion portion 27*a* is inserted into the interior within the loop formed by the fixing belt 21 at the lateral end of the fixing belt 21 in the longitudinal direction X thereof, the insertion portion 27*a* contacts the inner circumferential face 21*a* of the fixing belt 21, thus rotatably holding or supporting the fixing belt 21.

The belt holder 27 is made of a resin material called super engineering plastic such as polyphenylene sulfide, polyether ether ketone, polyarylate, liquid crystal polymer, polyimide, polybenzimidazole, and polybutylene naphthalate. In view of machining and heat resistance, liquid crystal polymer is preferable. If the belt holder 27 is made of the super engineering plastic mixed with glass fiber, the belt holder 27 is preferably immune from deformation caused by temperature change.

The temperature sensor 28 serves as a temperature detector that detects a temperature of the fixing belt 21. According to the embodiment, the temperature sensor 28 is anon-contact type temperature sensor that does not contact the outer circumferential face of the fixing belt 21. In this case, the temperature sensor 28 detects an ambient temperature at a position in proximity to the outer circumferential face of the fixing belt 21 as a surface temperature of the fixing belt 21. Alternatively, instead of the non-contact type temperature sensor, the temperature sensor 28 may be a contact type temperature sensor that contacts the fixing belt 21 and detects the surface temperature of the fixing belt 21. For example, general temperature sensors such as a thermopile, a thermostat, a thermistor, and a normally closed (NC) sensor are used as the temperature sensor 28.

A description is provided of operation of the fixing device 20 according to the embodiment.

As the image forming apparatus 100 starts a print job, a driver starts driving and rotating the pressure roller 22 clockwise in FIG. 2 in the rotation direction D22. The pressure roller 22 drives and rotates the fixing belt 21. The halogen heaters 23 emit radiant heat (e.g., infrared light), heating the fixing belt 21. A controller controls a heat generation amount of the halogen heaters 23 based on a temperature of the fixing belt 21, that is detected by the temperature sensor 28, thus adjusting the temperature of the fixing belt 21 to a predetermined fixing temperature at which the fixing belt 21 fixes the toner image on the sheet P. Thereafter, in a state in which the fixing belt 21 has the predetermined fixing temperature, as a sheet P bearing an unfixed toner image is conveyed through the fixing nip N formed between the fixing belt 21 and the pressure roller 22, the fixing belt 21 and the pressure roller 22 fix the unfixed toner image on the sheet P under heat and pressure.

With the above-described construction of the fixing device 20, as the fixing belt 21 rotates, the fixing belt 21 slides over the nip formation pad 24. In order to decrease sliding friction between the fixing belt 21 and the nip formation pad 24, a lubricant such as silicone oil, silicone grease, fluorine oil, and fluorine grease is generally interposed between the fixing belt 21 and the nip formation pad 24. For example, the lubricant is impregnated into the slide sheet 30 depicted in FIG. 2 interposed between the base pad 29 of the nip formation pad 24 and the inner circumferential face 21*a* of the fixing belt 21. As the lubricant seeps out of the slide sheet 30, the lubricant is interposed between the nip formation pad 24 and the fixing belt 21.

As described above, the pair of belt holders 27 holds the fixing belt 21. Hence, as the fixing belt 21 rotates, the fixing belt 21 slides over the belt holders 27. Since sliding friction generates also between the fixing belt 21 and the belt holders 27, in order to decrease sliding friction between the fixing belt 21 and the belt holders 27, the lubricant described above is interposed also between the fixing belt 21 and the belt holders 27.

As described above, in the fixing device 20 incorporating slide aids such as the nip formation pad 24 and the belt holders 27, in order to improve sliding of the fixing belt 21, the silicone oil, the silicone grease, the fluorine oil, the fluorine grease, or the like is generally used as the lubricant. However, if the lubricant suffers from temperature increase, a part of components of a low molecular-weight compound volatilizes. The volatilized component is cooled in air and aggregated, generating fine particles. Hence, if the fixing device 20 suffers from temperature increase, the lubricant applied inside the fixing device 20 may generate the fine particles. The fine particles denote fine particles (FP) and ultrafine particles (UFP) measured under measurement conditions described below used to examine a relation between a temperature of the lubricant and a concentration of the fine particles that are generated with reference to FIG. 5. The fine particles and the ultrafine particles are hereinafter referred to as FP/UFP. The fine particle denotes a particle having a particle diameter in a range of from 5.6 nm to 560 nm.

A description is provided of a construction of a first comparative fixing device.

The first comparative fixing device includes a rotator such as a belt and a rotator holder that rotatably holds the rotator. As the rotator rotates, sliding friction generates between the rotator and the rotator holder. Hence, in order to decrease sliding friction between the rotator and the rotator holder, a substance having lubricity such as oil and grease (hereinafter referred to as a lubricant) is generally used. The substance having lubricity denotes a substance that is interposed between parts and decreases frictional resistance between the parts.

Environmental awareness increases in overseas countries, especially in Europe. Image forming apparatuses using electrophotography, such as copiers, multifunction peripherals, and printers, are also applied with various accreditation criteria for volatile organic compounds (VOC), ozone, dust, and fine particles that generate during image formation. For example, a research institute of the German government authorizes an ecolabel called the Blue Angel mark. Usage of the ecolabel is permitted to products and services that are accredited.

Sales is not prohibited for products that are not accredited with the Blue Angel mark. However, the products that are not accredited with the Blue Angel mark are often regarded as being not environmentally friendly, especially in government offices. Hence, whether or not the products are accredited with the Blue Angel mark may affect sales of the products substantially.

In order to obtain accreditation of the Blue Angel mark, the products are requested to pass various examinations. Examinations for fine particles are very difficult to pass. For example, fine particles that have a size in a range of from 5.6 nm to 560 nm and generate from an image forming apparatus are measured with a particle measurement device, that is, a fast mobility particle sizer (FMPS). The number of the fine particles is requested to be smaller than $3.5\times10^{11}$ pieces per 10 minutes. The number of the fine particles is not classified by a type and a status of a substance of a fine particle. For example, the number of the fine particles is not classified by whether the fine particles are organic or inorganic and whether the fine particles are solid or liquid (e.g., mist). The size and the number of the fine particles are concerned. More strict criteria are expected in the future.

The image forming apparatus includes various elements that generate the fine particles. However, as the first comparative fixing device of the image forming apparatus starts, a generation amount of the fine particles increases substantially. Hence, the first comparative fixing device is regarded as a main source of the fine particles. As the lubricant is heated to a high temperature, a very small part of components of the lubricant is volatilized as hot gas. The gas is cooled and is subject to condensation into the fine particles. As the lubricant described above is heated to the high temperature, the fine particles are detected. Hence, the lubricant is one of sources of the fine particles. Accordingly, the lubricant is requested not to be exposed in a hot environment so as to suppress generation of the fine particles from the image forming apparatus.

In recent years, increased environmental awareness requests solutions to suppress generation of the FP/UFP that are emitted from products. Hence, development of image forming apparatuses that reduce generation of the FP/UFP is requested.

A description is provided of a test to examine the solutions to reduce generation of the FP/UFP from a fixing device.

Figure 5:
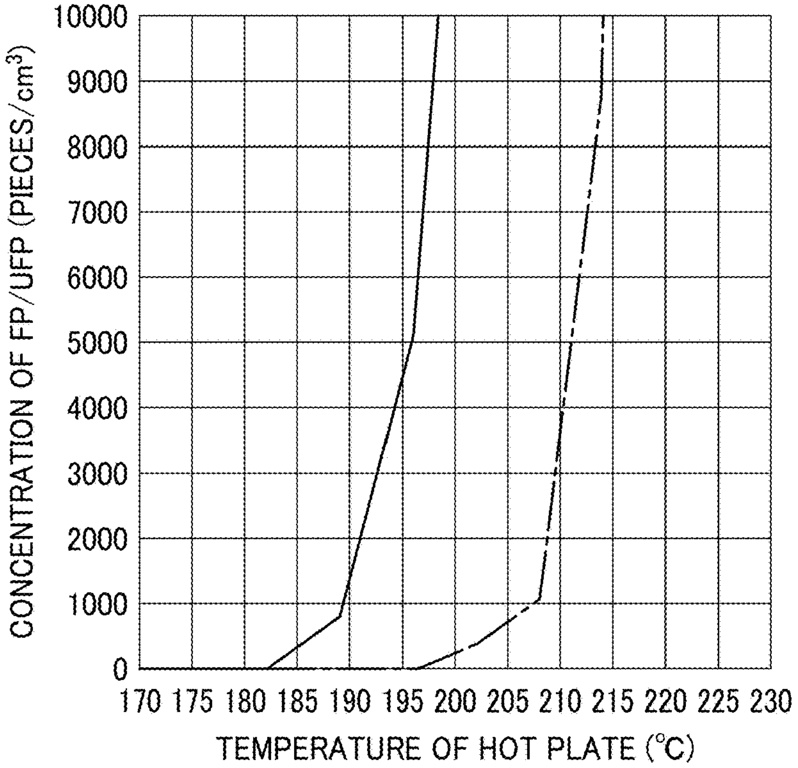
FIG. 5 is a graph illustrating a relation between a temperature of a lubricant and a concentration of fine particles that generate from the lubricant.

The test examines a relation between temperature increase of silicone oil and fluorine grease used as a lubricant and a concentration of the FP/UFP generated from the lubricant (e.g., the number of the FP/UFP per cubic centimeter). FIG. 5 illustrates results of the test.

Figure 6:
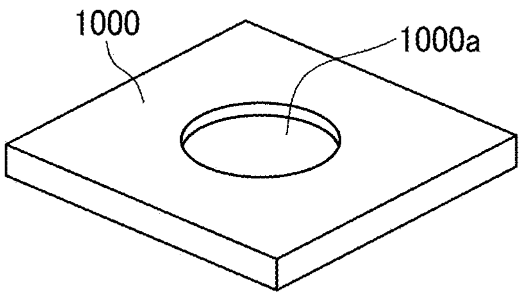
FIG. 6 is a perspective view of a sample container.

In the test, a lubricating substance that was liquid or semisolid in a sample container was heated in a 1-cubic meter chamber that conformed to Japanese Industrial Standards JIS A 1901 at a ventilation rate of 5 times. As illustrated in FIG. 6, a sample container 1000 is an aluminum plate having a length of 50 mm, a width of 50 mm, and a height of 5 mm. The sample container 1000 includes a cavity 1000*a* having a diameter of 22 mm and a depth of 2 mm. A sample was placed in the cavity 1000*a*. The sample container 1000 placed with the sample was placed on a hot plate of a heating device (e.g., a clean hot plate MH-180CS and a controller MH-3CS manufactured by AS ONE Corporation). The hot plate heated the sample at a preset temperature of 250 degrees Celsius. While a temperature of the hot plate was monitored, a number concentration of the FP/UFP in the chamber was measured with a measurement device (e.g., a Fast Mobility Particle Sizer™ (FMPS) spectrometer Model 3091 manufactured by TSI Incorporated) with a use averaging interval of 30 seconds during export. Fluorine grease and silicone oil were used as the lubricant. An amount of the sample was 36 μl. FIG. 5 illustrates the number concentration of the FP/UFP generated from the fluorine grease with a solid line. FIG. 5 illustrates the number concentration of the FP/UFP generated from the silicone oil with an alternate long and short dash line. FIG. 5 illustrates the temperature of the hot plate on a horizontal axis. Temperature increase of the hot plate changes approximately in sync with temperature increase of the lubricant. Hence, the temperature of the hot plate is regarded as the temperature of the lubricant.

As illustrated in FIG. 5, the fluorine grease illustrated with the solid line started generating the FP/UFP approximately when the temperature of the fluorine grease reached 185 degrees Celsius. Approximately when the temperature of the fluorine grease exceeded 194 degrees Celsius, the number concentration of the FP/UFP increased sharply. On the other hand, the silicone oil illustrated with the alternate long and short dash line started generating the FP/UFP approximately when the temperature of the silicone oil reached 200 degrees Celsius. Approximately when the temperature of the silicone oil exceeded 210 degrees Celsius, the number concentration of the FP/UFP increased sharply. The temperature at which the number concentration of the FP/UFP increased sharply defined a generation temperature of fine particles at which the number concentration of the FP/UFP in the chamber was 4,000 pieces per cubic centimeter or more.

As described above, the fluorine grease generated the FP/UFP when the temperature of the fluorine grease reached 185 degrees Celsius. The silicone oil generated the FP/UFP when the temperature of the silicone oil reached 200 degrees Celsius. Accordingly, in the fixing device that is heated to a temperature higher than 200 degrees Celsius, the lubricant may generate the FP/UFP. Hence, in order to suppress generation of the FP/UFP effectively, the fixing device is requested to suppress temperature increase in a generation source of the fixing device, that is subject to generation of the FP/UFP.

The belt holder 27 is one example of the generation source that is subject to generation of the FP/UFP. As described above, an outer circumferential face of the belt holder 27 is applied with the lubricant (designated by 27*d* in FIG. 3) that decreases sliding friction between the fixing belt 21 and the belt holder 27. Accordingly, as the belt holder 27 suffers from temperature increase, the lubricant adhered to the belt holder 27 also suffers from temperature increase, generating the FP/UFP. Even if the lubricant is not applied to the outer circumferential face of the belt holder 27 constantly, as the fixing belt 21 rotates, the lubricant interposed between the fixing belt 21 and the nip formation pad 24 may flow or move, adhering to the outer circumferential face of the belt holder 27.

Figure 7:
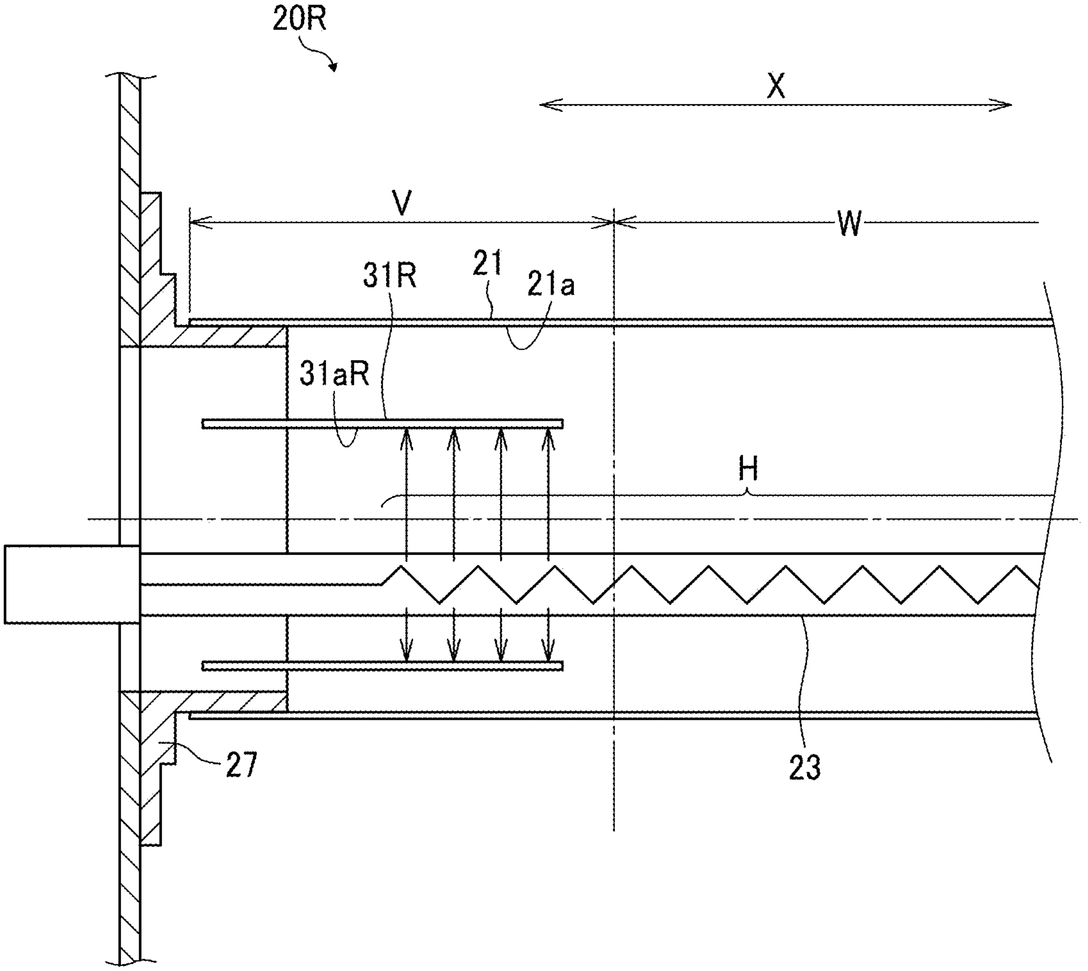
FIG. 7 is a cross-sectional view of a comparative fixing device.

Referring to FIG. 7 illustrating a construction of a fixing device 20R as a second comparative fixing device, a description is provided of causes of temperature increase of the belt holder 27.

As illustrated in FIG. 7, the fixing device 20R includes the fixing belt 21, the halogen heater 23, the belt holder 27, and a heat shield 31R.

When a plurality of sheets is conveyed through the fixing device 20R continuously, the sheets are conveyed over a sheet conveyance span, that is, a recording medium conveyance span, on the fixing belt 21 in the longitudinal direction X thereof. In a non-conveyance span V disposed outboard from the sheet conveyance span in the longitudinal direction X of the fixing belt 21, the sheets do not draw heat from the fixing belt 21. Accordingly, the fixing belt 21 stores heat and is subject to temperature increase. When the fixing belt 21 suffers from temperature increase in each lateral end span in the non-conveyance span V in the longitudinal direction X of the fixing belt 21, the belt holder 27 that holds each lateral end of the fixing belt 21 in the longitudinal direction X thereof receives heat from the fixing belt 21 and suffers from temperature increase. For example, in order to prevent temperature decrease of each lateral end span of the fixing belt 21 in the longitudinal direction X thereof, that contacts each lateral end of an image formed on a sheet, immediately after image formation starts, the halogen heater 23 includes a heat generation portion H where a filament is coiled. The heat generation portion H extends beyond a maximum sheet conveyance span Win the longitudinal direction X of the fixing belt 21. A sheet having a maximum size available in the fixing device 20R is conveyed in the maximum sheet conveyance span W. Accordingly, the fixing belt 21 is subject to temperature increase in the non-conveyance span V, causing the belt holder 27 to suffer from substantial temperature increase.

To address the temperature increase, the heat shield 31R is disposed opposite the fixing belt 21 in the non-conveyance span V disposed outboard from the maximum sheet conveyance span Win the longitudinal direction X of the fixing belt 21. The heat shield 31R shields the fixing belt 21 from radiant heat emitted from the halogen heater 23. The heat shield 31R is disposed in the non-conveyance span V. The heat shield 31R is interposed between the halogen heater 23 and the fixing belt 21 and between the halogen heater 23 and the belt holder 27. The heat shield 31R shields the fixing belt 21 and the belt holder 27 from radiant heat radiated from the halogen heater 23. As the heat shield 31R blocks radiant heat from the halogen heater 23, the heat shield 31R suppresses overheating of the fixing belt 21 in the non-conveyance span V. Thus, the heat shield 31R suppresses temperature increase of the belt holder 27 caused by temperature increase of the fixing belt 21. Since the heat shield 31R also shields the belt holder 27 from radiant heat, the heat shield 31R prevents the halogen heater 23 from irradiating the belt holder 27 directly with radiant heat, also suppressing temperature increase of the belt holder 27.

However, the heat shield 31R receives radiant heat emitted from the halogen heater 23 directly and is heated gradually. Since the heat shield 31R is disposed in proximity to the belt holder 27, the heat shield 31R conducts heat to the belt holder 27 easily. For example, if the fixing device 20R is downsized to accommodate the fixing belt 21 having a decreased diameter, the heat shield 31R is disposed closer to the belt holder 27. Hence, the belt holder 27 is more subject to heat conduction from the heat shield 31R. Accordingly, as the heat shield 31R suffers from temperature increase, the belt holder 27 may be affected by temperature increase of the heat shield 31R and may suffer from temperature increase. Consequently, the lubricant adhered to the belt holder 27 may generate the FP/UFP.

According to the results of the test illustrated in FIG. 5, as the temperature of the lubricant increases, the number concentration in a unit of pieces per cubic centimeter of the FP/UFP increases. For example, as the temperature of the belt holder 27 increases, the number of the FP/UFP that generates from the lubricant increases. Accordingly, in order to decrease the number of the FP/UFP that generates from the lubricant effectively, suppression of temperature increase of the belt holder 27 is requested.

According to embodiments of the present disclosure, in order to suppress temperature increase of the belt holder 27, solutions described below are employed.

Figure 8:
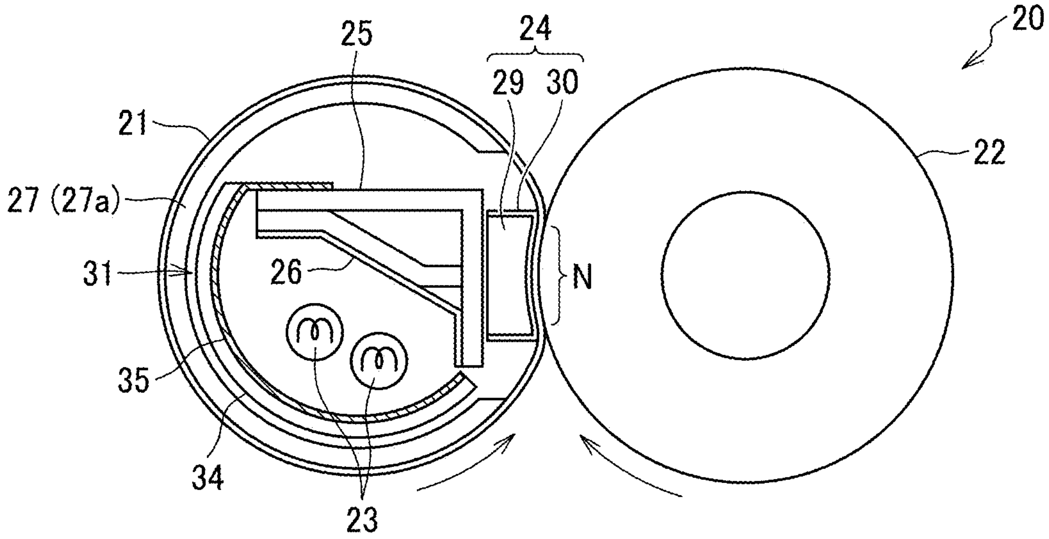
FIG. 8 is a cross-sectional view of the fixing device depicted in FIG. 4 on a cross section taken on line A-A.
Figure 9:
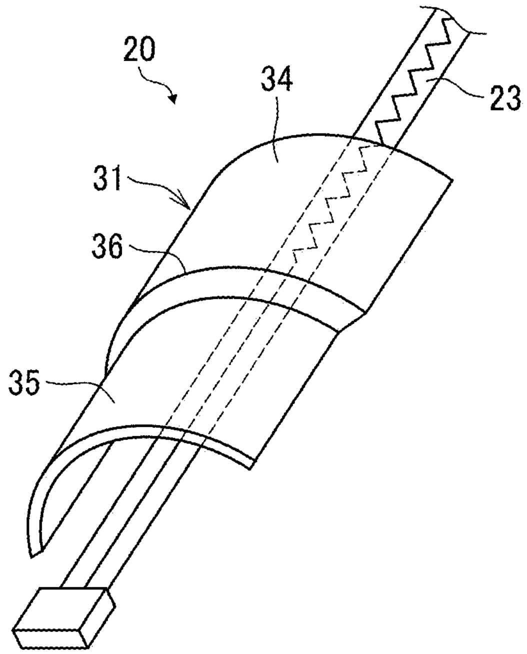
FIG. 9 is a perspective view of a heat shield incorporated in the fixing device depicted in FIG. 4.

FIGS. 4, 8, and 9 illustrate a construction of the fixing device 20 according to a first embodiment of the present disclosure. FIG. 4 is a cross-sectional view of the fixing device 20 according to the first embodiment of the present disclosure, illustrating one lateral end span of the fixing belt 21 in the longitudinal direction X thereof on a cross section along the longitudinal direction X of the fixing belt 21. FIG. 8 is across-sectional view of the fixing device 20 on a cross section taken on line A-A in FIG. 4. FIG. 9 is a partial perspective view of the fixing device 20, illustrating the heat shield 31 according to the embodiment.

As illustrated in FIG. 4, the fixing device 20 according to the embodiment includes the heat shield 31 that is disposed within the loop formed by the fixing belt 21 and disposed opposite the inner circumferential face 21*a* of the fixing belt 21. The heat shield 31 blocks radiant heat (e.g., infrared light) radiated from the halogen heaters 23. The heat shield 31 is disposed in the non-conveyance span V disposed outboard from the maximum sheet conveyance span Win the longitudinal direction X of the fixing belt 21. The heat shield 31 is interposed between the halogen heater 23 and the fixing belt 21 and between the halogen heater 23 and the belt holder 27. The heat shield 31 shields the fixing belt 21 and the belt holder 27 from radiant heat radiated from the halogen heater 23. As illustrated in FIG. 8, the heat shield 31 is secured to the stay 25 such that the heat shield 31 does not contact the fixing belt 21 and the belt holder 27 and does not move. Although FIG. 4 illustrates a construction of the fixing device 20 in one lateral end part thereof in the longitudinal direction X of the fixing belt 21, the heat shield 31 is disposed within the loop formed by the fixing belt 21 also in another lateral end part opposite to the one lateral end part of the fixing device 20 in the longitudinal direction X of the fixing belt 21 like the heat shield 31 disposed in the one lateral end part of the fixing device 20. That is, the heat shield 31 is disposed opposite the fixing belt 21 in each lateral end span thereof, that is outboard from a predetermined center span (e.g., the maximum sheet conveyance span W) including a center of the fixing belt 21 in the longitudinal direction X thereof.

The heat shield 31 according to the embodiment has a shape that is different from a shape of the heat shield 31R depicted in FIG. 7. For example, the heat shield 31 according to the embodiment has a step unlike the heat shield 31R depicted in FIG. 7 that is linear in cross section. Specifically, as illustrated in FIGS. 4, 8, and 9, the heat shield 31 according to the embodiment includes a first portion 34, a second portion 35, and a bent portion 36. The first portion 34 extends linearly in the longitudinal direction X of the fixing belt 21. The second portion 35 is coupled with the first portion 34 through the bent portion 36 and is L-shaped in cross section.

The second portion 35 includes an orthogonal portion that extends from the bent portion 36 toward the halogen heater 23 (e.g., an inner part of the fixing belt 21) in an orthogonal direction that intersects or is perpendicular to the longitudinal direction X of the fixing belt 21. The second portion 35 further includes a parallel portion that extends from a front edge of the orthogonal portion toward a lateral edge portion (e.g., a left edge portion in FIG. 4) of the fixing belt 21 in the longitudinal direction X thereof. Thus, the second portion 35 is disposed closer to the halogen heater 23 than the first portion 34 is. In other words, the second portion 35 extends toward the lateral edge portion of the fixing belt 21 in the longitudinal direction X thereof such that the second portion 35 is separated farther from the inner circumferential face 21*a* of the fixing belt 21 than the first portion 34 is. A state in which the second portion 35 is separated from the inner circumferential face 21*a* of the fixing belt 21 denotes that the second portion 35 of the heat shield 31 is displaced inward in a radial direction of the fixing belt 21.

As described above, according to the embodiment, the heat shield 31 has the second portion 35 as a lateral end portion of the heat shield 31 in the longitudinal direction X of the fixing belt 21, that is separated from the inner circumferential face 21*a* of the fixing belt 21 farther than the first portion 34 as a center portion of the heat shield 31 in the longitudinal direction X of the fixing belt 21. Hence, compared to the heat shield 31R depicted in FIG. 7, the second portion 35 of the heat shield 31 is separated farther from an inner circumferential face 270 (e.g., an inner face) of the belt holder 27 as illustrated in FIG. 4. Accordingly, the heat shield 31 according to the embodiment suppresses conduction of heat from the heat shield 31 to the belt holder 27. Additionally, the heat shield 31 does not contact the belt holder 27, preventing conduction of heat to the belt holder 27, that may be caused by contact with the belt holder 27. As described above, according to the embodiment, even if the heat shield 31 suffers from temperature increase, the belt holder 27 is barely affected by temperature increase of the heat shield 31. Accordingly, the heat shield 31 suppresses temperature increase of the belt holder 27, suppressing generation of the FP/UFP from the lubricant adhered to the belt holder 27.

For example, the temperature of the belt holder 27 during continuous printing for 10 minutes is not higher than 210 degrees Celsius at which the number of the FP/UFP generating from silicone oil increases sharply, preferably not higher than 200 degrees Celsius as illustrated with the alternate long and short dash line in FIG. 5, thus suppressing generation of the FP/UFP from the silicone oil effectively. The temperature of the belt holder 27 is adjusted for a condition of continuous printing for 10 minutes because the image forming apparatus 100 is frequently used for continuous printing within a few minutes in a general market and is barely used for continuous printing for five minutes or longer. Hence, if the heat shield 31 suppresses generation of the FP/UFP at least during continuous printing for 10 minutes, the heat shield 31 suppresses generation of the FP/UFP sufficiently.

The temperature of the belt holder 27 during continuous printing for 10 minutes is not higher than 194 degrees Celsius at which the number of the FP/UFP generating from fluorine grease increases sharply, preferably not higher than 185 degrees Celsius as illustrated with the solid line in FIG. 5, thus also suppressing generation of the FP/UFP from the fluorine grease in addition to the silicone oil effectively.

Figure 10:
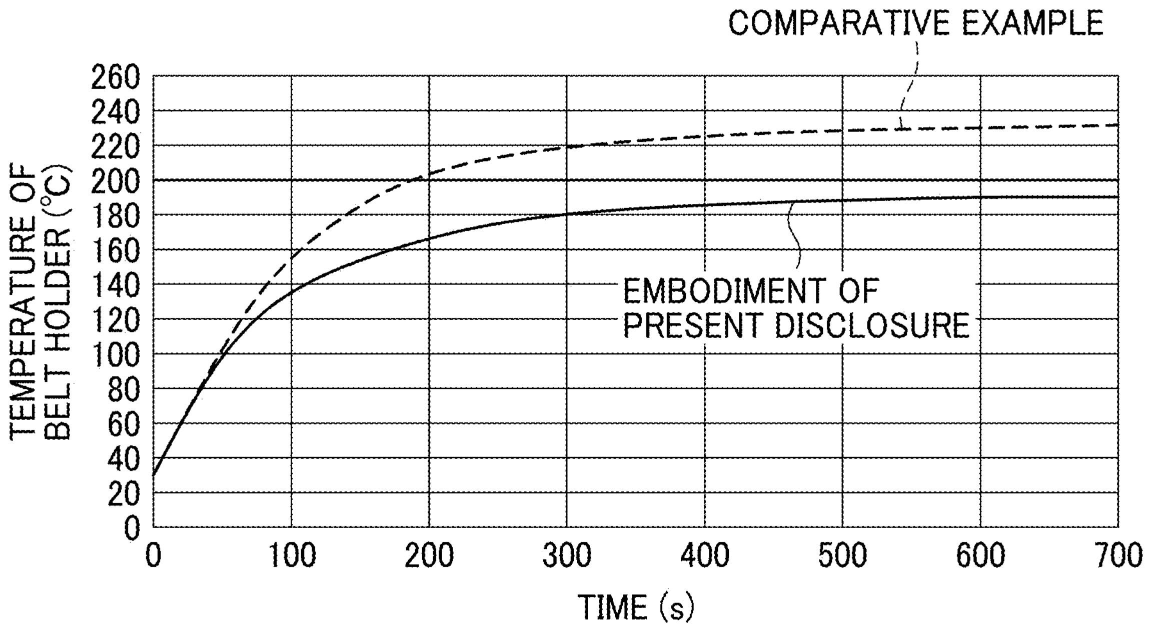
FIG. 10 is a graph illustrating temperature increase of a belt holder incorporated in the fixing device depicted in FIG. 4 by comparison with temperature increase of the belt holder incorporated in the comparative fixing device depicted in FIG. 7.

FIG. 10 is a graph illustrating temperature increase of the belt holder 27 according to the embodiment of the present disclosure by comparison with temperature increase of the belt holder 27 of the fixing device 20R depicted in FIG. 7 as a comparative example.

The fixing device 20 according to the embodiment of the present disclosure and the fixing device 20R depicted in FIG. 7 as the comparative example are installed in image forming apparatuses that print at a print speed of 50 pages per minute (ppm), respectively. A4 size sheets are conveyed continuously in landscape orientation such that a long length of each of the A4 size sheets is parallel to the longitudinal direction X of the fixing belt 21. Temperature increase of the belt holder 27 is measured. FIG. 10 illustrates temperature increase of the belt holder 27 according to the embodiment of the present disclosure with a solid line. FIG. 10 illustrates temperature increase of the belt holder 27 depicted in FIG. 7 as the comparative example with a broken line.

As a result, as illustrated in FIG. 10, the temperature of the belt holder 27 as the comparative example increases to 230 degrees Celsius when 10 minutes pass after continuous printing starts. Since the heat shield 31R is disposed in proximity to the belt holder 27 as illustrated in FIG. 7, the belt holder 27 is conceivably affected by temperature increase of the heat shield 31R and suffers from temperature increase. Conversely, the temperature of the belt holder 27 according to the embodiment of the present disclosure increases to 190 degrees Celsius when 10 minutes pass after continuous printing starts. Thus, the heat shield 31 according to the embodiment of the present disclosure suppresses temperature increase of the belt holder 27 compared to the heat shield 31R as the comparative example. For example, the heat shield 31 according to the embodiment of the present disclosure is separated from the belt holder 27 farther than the heat shield 31R as the comparative example is, thus suppressing temperature increase of the belt holder 27 conceivably. If the temperature of the belt holder 27 according to the embodiment of the present disclosure is not higher than 190 degrees Celsius during continuous printing for 10 minutes, whether silicone oil or fluorine grease is used as the lubricant, the heat shield 31 suppresses generation of the FP/UFP from the lubricant effectively. As described above, the heat shield 31 according to the embodiment of the present disclosure suppresses temperature increase of the belt holder 27, thus suppressing generation of the FP/UFP from the lubricant adhered to the belt holder 27 effectively. If the belt holder 27 is adhered with the lubricant of two types or more, the controller preferably controls the halogen heater 23 to generate heat so that a temperature of the belt holder 27 is lower than a lower temperature at which one of the two types or more of the lubricant generates the FP/UFP during continuous printing for 10 minutes.

The temperature of a belt holder (e.g., the belt holder 27) during continuous printing for 10 minutes denotes a temperature of the belt holder 27 measured with processes described below. An image forming apparatus (e.g., the image forming apparatus 100) installed with a fixing device or a heating device (e.g., the fixing device 20) is placed in a test chamber at an ambient temperature of 23 degrees Celsius. A power supply of the image forming apparatus is turned on to start the image forming apparatus. A print instruction is sent after a standby time for 60 minutes, for example, elapses. As print conditions, a mode in which a highest print speed is set as a default print speed is selected. Sheets having a paper weight of 70 $g/m^2$ and an A4 size or a letter size are used. Sheets for which conveyance in landscape orientation is available are conveyed in landscape orientation. Sheets for which conveyance in landscape orientation is not available are conveyed in portrait orientation. Conveyance in landscape orientation denotes that a sheet is conveyed in a state in which a long side of the sheet extends in an orthogonal direction perpendicular to a conveyance direction of the sheet. Conveyance in portrait orientation denotes that a sheet is conveyed in a state in which a short side of the sheet extends in the orthogonal direction perpendicular to the conveyance direction of the sheet. From a print start time when a first sheet is ejected from a sheet tray (e.g., the sheet tray 14), a thermocouple measures a temperature of the belt holder for 10 minutes. However, if a continuous print time is restricted to 10 minutes or shorter in relation to a capacity of an output tray (e.g., the output tray 18) and a capacity of the sheet tray, the temperature of the belt holder is measured within the continuous print time. In addition to the processes for measuring the temperature of the belt holder described above, the temperature of the belt holder may be measured with a device and a condition that conform to criteria of the Blue Angel mark for the fine particles.

Figure 11:
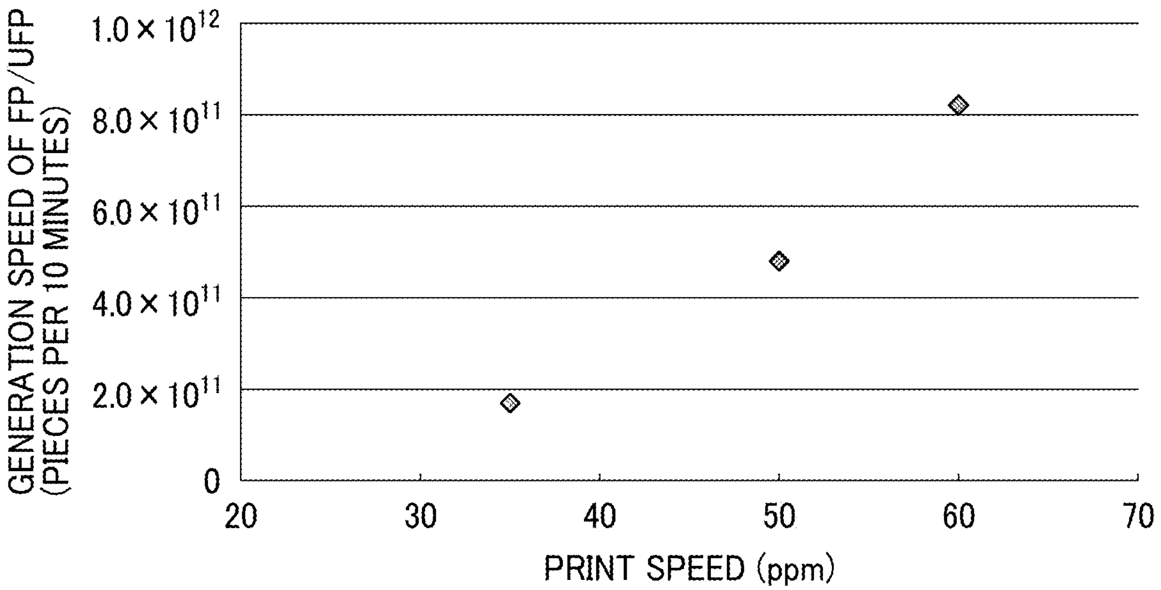
FIG. 11 is a graph illustrating a relation between a print speed and a number of fine particles that generate from the lubricant.

Temperature increase of the belt holder, that causes generation of the FP/UFP, becomes more pronounced as the image forming apparatus increases a number of prints per unit time. Hence, the heat shield 31 according to the embodiment of the present disclosure is more advantageous if the heat shield 31 is applied to the image forming apparatus that prints on an increased number of sheets. FIG. 11 illustrates a relation between a print speed and a number of the FP/UFP generated (e.g., a generation speed of the FP/UFP). The number of the FP/UFP generated from the fixing device 20 during continuous printing for 10 minutes increases sharply approximately at a print speed exceeding 50 ppm. Hence, the heat shield 31 is more advantageous if the heat shield 31 is installed in the fixing device 20 or the image forming apparatus 100 that prints at a print speed of 50 ppm or higher.

According to the embodiment of the present disclosure, as illustrated in FIG. 4, the halogen heater 23 includes the heat generation portion H that extends beyond the maximum sheet conveyance span W in the longitudinal direction X of the fixing belt 21. Hence, the belt holder 27 is subject to temperature increase. Accordingly, the heat shield 31 is more advantageous if the heat shield 31 is installed in the fixing device 20.

As described above, the heat shield 31 according to the embodiment of the present disclosure depicted in FIG. 4 has the step. A part of the heat shield 31 (e.g., the second portion 35) is disposed opposite the fixing belt 21 in each lateral end span in the longitudinal direction X of the fixing belt 21 and is separated from the belt holder 27 farther than the first portion 34 is. Unlike the heat shield 31 according to the embodiment of the present disclosure, the heat shield 31R depicted in FIG. 7 is linear, for example. If an entirety of the heat shield 31R is separated from the inner circumferential face 21*a* of the fixing belt 21 with an increased clearance therebetween, the belt holder 27 is less subject to heat conduction from the heat shield 31R. Thus, temperature increase of the belt holder 27 is suppressed. However, since the entirety of the heat shield 31R is disposed closer to the halogen heater 23, the heat shield 31R may suffer from overheating and resultant deformation or the like. As the heat shield 31R suffers from overheating, the belt holder 27 may be affected by overheating of the heat shield 31R and may suffer from temperature increase.

To address the circumstance of the heat shield 31R, the heat shield 31 according to the embodiment of the present disclosure has the step. A part of the heat shield 31 (e.g., the first portion 34) is separated from the halogen heater 23 farther than other part of the heat shield 31 (e.g., the second portion 35) is. Accordingly, compared to the heat shield 31R that is entirely disposed in proximity to the halogen heater 23, the heat shield 31 suppresses temperature increase thereof and is immune from thermal deformation. Additionally, the heat shield 31 suppresses temperature increase of the belt holder 27 effectively, that may be caused by temperature increase of the heat shield 31.

According to the embodiment of the present disclosure, the second portion 35 of the heat shield 31 is disposed closer to the halogen heater 23 than the first portion 34 is. In order to prevent the second portion 35 from being affected by heat from the halogen heater 23 excessively, the second portion 35 is preferably disposed opposite a decreased heat generation portion G of the halogen heater 23, that generates heat in a decreased heat generation amount. Specifically, the second portion 35 is preferably disposed opposite the decreased heat generation portion G of the halogen heater 23, that generates heat in the decreased heat generation amount that is not greater than 50% of a maximum heat generation amount of the halogen heater 23. For example, the decreased heat generation portion G of the halogen heater 23, that is disposed outboard from the heat generation portion H in the longitudinal direction X of the halogen heater 23, generates heat in the decreased heat generation amount that is not greater than 50% of the maximum heat generation amount. The decreased heat generation portion G is defined by a linear portion of the filament. Accordingly, as illustrated in FIG. 4, the second portion 35 is disposed opposite the decreased heat generation portion G of the halogen heater 23, that generates heat in the decreased heat generation amount that is not greater than 50% of the maximum heat generation amount. The decreased heat generation portion G is disposed outboard from the heat generation portion H in the longitudinal direction X of the halogen heater 23. Thus, the second portion 35 prevents overheating thereof.

The decreased heat generation portion G of the halogen heater 23, that is disposed opposite the second portion 35, generates heat in the decreased heat generation amount decreased with respect to the maximum heat generation amount at a rate in percent examined by a method described below.

The single halogen heater 23 is supported at both lateral ends in the longitudinal direction X thereof. The halogen heater 23 includes electrodes disposed at both lateral ends of the halogen heater 23 in the longitudinal direction X thereof. The electrodes are supplied with a predetermined alternating current voltage of 100 V, for example, from a temperature controller ESEN available from OMRON Corporation so that the halogen heater 23 generates heat at a predetermined temperature. The temperature of the halogen heater 23 is measured with an infrared thermography FUR T620 available from Teledyne FLIR LLC, that is disposed above the halogen heater 23. Based on the measured temperature, deviation in the heat generation amount of the halogen heater 23 (e.g., the rate of the decreased heat generation amount of the decreased heat generation portion G of the halogen heater 23, that is disposed opposite the second portion 35 of the heat shield 31, with respect to the maximum heat generation amount) is examined.

As illustrated in FIG. 4, the bent portion 36 interposed between the first portion 34 and the second portion 35 of the heat shield 31 is preferably disposed outboard from the maximum sheet conveyance span W in the longitudinal direction X of the fixing belt 21. A distance from the fixing belt 21 to the first portion 34 is different from a distance from the fixing belt 21 to the second portion 35. Accordingly, if the bent portion 36 is disposed within the maximum sheet conveyance span W, the fixing belt 21 may suffer from uneven temperature within the maximum sheet conveyance span W due to variation in heat conduction from the first portion 34 and the second portion 35, degrading fixing of a toner image on a sheet P or gloss of the toner image. To address the circumstance, the bent portion 36 is preferably disposed outboard from the maximum sheet conveyance span W in the longitudinal direction X of the fixing belt 21. The bent portion 36 disposed outboard from the maximum sheet conveyance span W in the longitudinal direction X of the fixing belt 21 prevents uneven temperature of the fixing belt 21 caused at the bent portion 36 as a boundary, thus achieving proper fixing of the toner image on the sheet P and proper gloss of the toner image.

The heat shield 31 may not block radiant heat (e.g., infrared light) radiated from the halogen heater 23 completely at a rate of 100%. The heat shield 31 may block a part of the radiant heat. Even if the heat shield 31 does not block the radiant heat completely, if the heat shield 31 decreases an amount of radiant heat radiated to the belt holder 27, the heat shield 31 suppresses temperature increase of the belt holder 27, suppressing generation of the FP/UFP. A state in which the heat shield 31 blocks radiant heat denotes a state in which the heat shield 31 absorbs radiant heat, a state in which the heat shield 31 reflects radiant heat, or a state in which the heat shield 31 absorbs and reflects radiant heat.

For example, the heat shield 31 has a halogen heater opposed face that is disposed opposite the halogen heater 23 and serves as a reflection face 31*a* constructed of an evaporated aluminum layer, an evaporated silver layer, or the like. The reflection face 31*a* reflects radiant heat. As the heat shield 31 reflects radiant heat from the halogen heater 23, the heat shield 31 decreases absorption of radiant heat, suppressing temperature increase thereof. Accordingly, the heat shield 31 is immune from thermal deformation and suppresses temperature increase of the belt holder 27, that may be caused by temperature increase of the heat shield 31.

Figure 12:
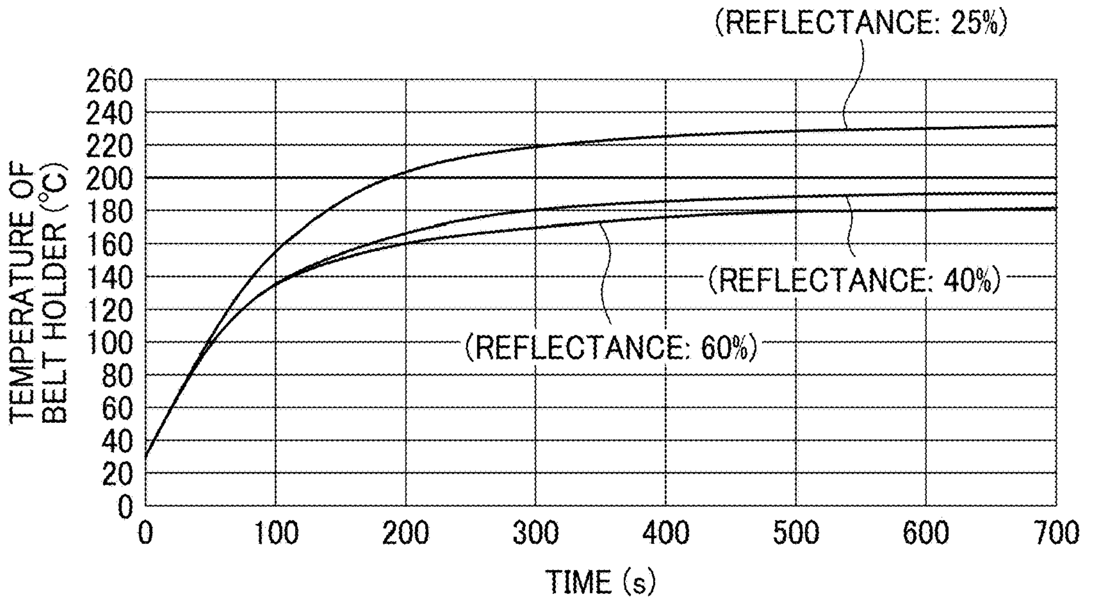
FIG. 12 is a graph illustrating temperature increase of the belt holder incorporated in the comparative fixing device depicted in FIG. 7 with different radiant heat reflectances of a comparative heat shield incorporated in the comparative fixing device depicted in FIG. 7.

FIG. 12 is a graph illustrating temperature increase of the belt holder 27 with the heat shield 31R depicted in FIG. 7 as the comparative example as a radiant heat reflectance of a reflection face 31*a*R of the heat shield 31R, that is disposed opposite the halogen heater 23, changes. The radiant heat reflectance is obtained by measuring a reflectance of the heat shield 31R with a UV-Visible/NIR Spectrophotometer UH4150 available from Hitachi Hi-Tech Corporation at an incident angle of 5 degrees.

As illustrated in FIG. 12, if the heat shield 31R has a radiant heat reflectance of 25%, when 10 minutes pass after continuous printing starts, the temperature of the belt holder 27 increases to 230 degrees Celsius. Conversely, if the heat shield 31R has a radiant heat reflectance of 40%, when 10 minutes pass after continuous printing starts, the belt holder 27 has a temperature of 190 degrees Celsius. Thus, the heat shield 31R suppresses temperature increase of the belt holder 27. If the heat shield 31R has a radiant heat reflectance of 60%, when 10 minutes pass after continuous printing starts, the heat shield 31R suppresses temperature increase of the belt holder 27 at 180 degrees Celsius.

Based on results illustrated in FIG. 12, also with the heat shield 31 according to the embodiment of the present disclosure depicted in FIG. 4, the reflection face 31*a* of the heat shield 31, that is disposed opposite the halogen heater 23, reflects radiant heat from the halogen heater 23 and has a radiant heat reflectance not smaller than 40%, thus suppressing temperature increase of the heat shield 31 effectively. Accordingly, the heat shield 31 suppresses temperature increase of the belt holder 27, suppressing generation of the FP/UFP further. Additionally, the reflection face 31*a* of the heat shield 31, that is disposed opposite the halogen heater 23, has a radiant heat reflectance not smaller than 60%, suppressing generation of the FP/UFP more effectively. A portion of the heat shield 31, that has a radiant heat reflectance not smaller than 40% or 60%, may be an entirety of the reflection face 31*a* disposed opposite the halogen heater 23 or a part of the reflection face 31*a* (e.g., a portion of the reflection face 31*a*, that is mounted on the second portion 35).

A description is provided of embodiments of the present disclosure, that are different from the first embodiment described above. The embodiments are described mainly of constructions that are different from the construction of the first embodiment described above. A description of the constructions that are common to the first embodiment described above is omitted properly.

Figure 13:
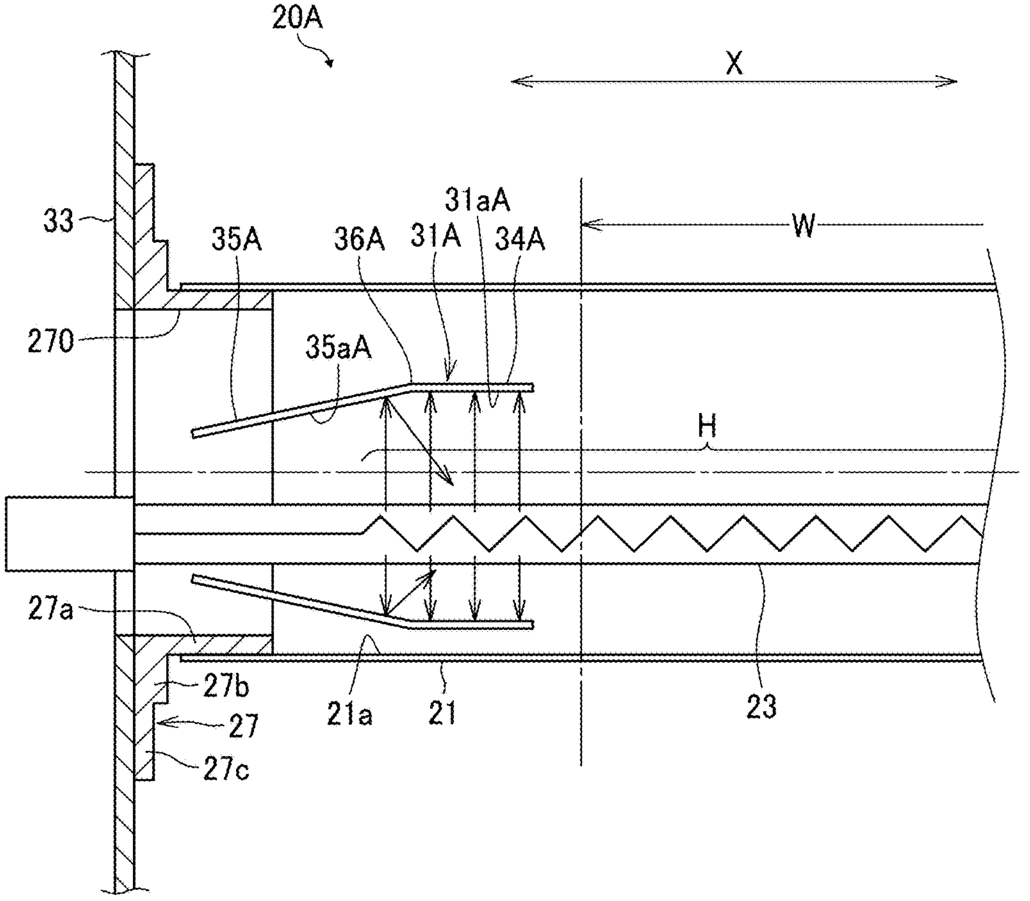
FIG. 13 is a cross-sectional view of a fixing device according to a second embodiment of the present disclosure, that is installable in the image forming apparatus depicted in FIG. 1, illustrating the lateral end span of the fixing belt incorporated in the fixing device in the longitudinal direction of the fixing belt.

FIG. 13 illustrates a construction of a fixing device 20A according to a second embodiment of the present disclosure.

As illustrated in FIG. 13, the fixing device 20A according to the second embodiment includes a heat shield 31A including a first portion 34A, a second portion 35A, and a bent portion 36A. The second portion 35A is extended toward the lateral edge portion of the fixing belt 21 in the longitudinal direction X thereof (e.g., leftward in FIG. 13) and is inclined such that the second portion 35A is separated gradually from the inner circumferential face 21*a* of the fixing belt 21. For example, the heat shield 31A according to the second embodiment includes the first portion 34A and the second portion 35A. The first portion 34A extends in the longitudinal direction X of the fixing belt 21. The second portion 35A is angled relative to the longitudinal direction X of the fixing belt 21 such that the second portion 35A is separated gradually from the inner circumferential face 21*a* of the fixing belt 21.

As described above, according to the second embodiment, the second portion 35A is inclined with respect to the longitudinal direction X of the fixing belt 21 and separated from the inner circumferential face 21*a* of the fixing belt 21 gradually. Thus, the heat shield 31A is separated from the belt holder 27 with an increased clearance therebetween. Accordingly, with the construction of the fixing device 20A according to the second embodiment also, the belt holder 27 is less subject to heat conduction from the heat shield 31A. Consequently, the heat shield 31A suppresses temperature increase of the belt holder 27, suppressing generation of the FP/UFP from the lubricant adhered to the belt holder 27.

According to the second embodiment, the second portion 35A is inclined with respect to the longitudinal direction X of the fixing belt 21. Hence, the second portion 35A has an inner face 35*a*A disposed opposite the halogen heater 23. The inner face 35*a*A is directed to a center span of the fixing belt 21 in the longitudinal direction X thereof. For example, the inner face 35*a*A is directed rightward in FIG. 13. Accordingly, as the halogen heater 23 emits radiant heat (e.g., infrared light) toward the heat shield 31A, the inner face 35*a*A of the second portion 35A, that is disposed opposite the halogen heater 23, reflects a part of the radiant heat toward the center span of the fixing belt 21 in the longitudinal direction X thereof. Consequently, the reflected radiant heat is used as thermal energy that heats the maximum sheet conveyance span W of the fixing belt 21. Thus, the heat shield 31A facilitates heating of the fixing belt 21 and improves energy saving. Additionally, the second portion 35A reflects radiant heat emitted by the halogen heater 23 toward the center span of the fixing belt 21 in the longitudinal direction X thereof, suppressing temperature increase of the heat shield 31A. Thus, the heat shield 31A is immune from thermal deformation and suppresses temperature increase of the belt holder 27, that may be caused by temperature increase of the heat shield 31A.

Figure 14:
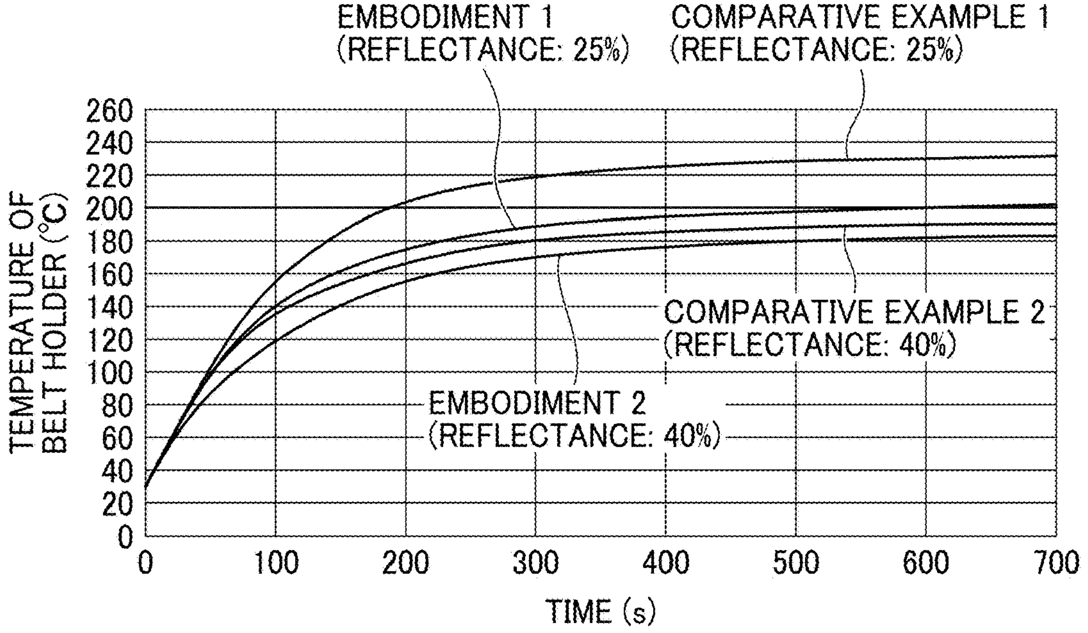
FIG. 14 is a graph illustrating temperature increase of the belt holder incorporated in the fixing device depicted in FIG. 13 and the belt holder incorporated in the comparative fixing device depicted in FIG. 7 with different radiant heat reflectances of a heat shield incorporated in the fixing device depicted in FIG. 13 and the comparative heat shield depicted in FIG. 7.

FIG. 14 is a graph illustrating temperature increase of the belt holder 27 with the heat shield 31A according to the second embodiment depicted in FIG. 13 and the heat shield 31R depicted in FIG. 7 as the comparative example, as a radiant heat reflectance of a reflection face 31*a*A of the heat shield 31A and a radiant heat reflectance of the reflection face 31*a*R of the heat shield 31R change. The reflection faces 31*a*A and 31*a*R are disposed opposite the halogen heater 23. The radiant heat reflectance of each of the heat shields 31A and 31R is also measured by the method described above.

FIG. 14 illustrates Embodiment 1 in which the heat shield 31A according to the second embodiment depicted in FIG. 13 has the radiant heat reflectance of 25% and Embodiment 2 in which the heat shield 31A according to the second embodiment depicted in FIG. 13 has the radiant heat reflectance of 40%. FIG. 14 further illustrates Comparative Example 1 in which the heat shield 31R depicted in FIG. 7 as the comparative example has the radiant heat reflectance of 25% and Comparative Example 2 in which the heat shield 31R depicted in FIG. 7 as the comparative example has the radiant heat reflectance of 40%.

As illustrated in FIG. 14, even with the identical radiant heat reflectance, the heat shield 31A according to the second embodiment suppresses temperature increase of the belt holder 27 during continuous printing for 10 minutes, compared to the heat shield 31R as the comparative example. For example, with the heat shield 31R according to Comparative Example 1 having the radiant heat reflectance of 25%, the temperature of the belt holder 27 increases to 230 degrees Celsius. Conversely, the heat shield 31A according to Embodiment 1 having the identical radiant heat reflectance of 25% suppresses temperature increase of the belt holder 27 at 200 degrees Celsius. With the heat shield 31R according to Comparative Example 2 having the radiant heat reflectance of 40%, the temperature of the belt holder 27 increases to 190 degrees Celsius. Conversely, the heat shield 31A according to Embodiment 2 having the identical radiant heat reflectance of 40% suppresses temperature increase of the belt holder 27 at 182 degrees Celsius.

As described above, even if the heat shield 31A according to the second embodiment of the present disclosure has the radiant heat reflectance that is identical to the radiant heat reflectance of the heat shield 31R as the comparative example, the heat shield 31A suppresses temperature increase of the belt holder 27 more than the heat shield 31R as the comparative example. Thus, the heat shield 31A according to the second embodiment of the present disclosure suppresses temperature increase of the belt holder 27 effectively, suppressing generation of the FP/UFP from the lubricant adhered to the belt holder 27. If the heat shield 31A according to the second embodiment of the present disclosure has the radiant heat reflectance of 40% or greater, the heat shield 31A suppresses generation of the FP/UFP more effectively.

Figure 15:
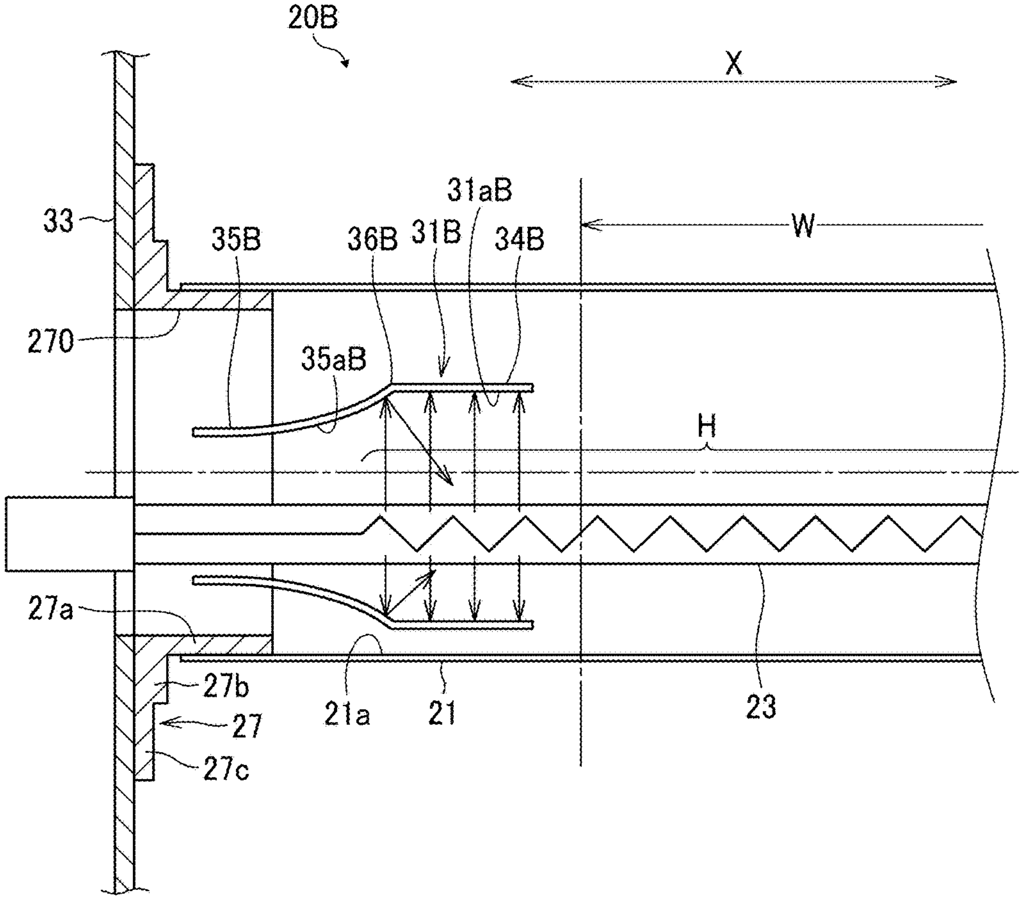
FIG. 15 is a cross-sectional view of a fixing device according to a third embodiment of the present disclosure, that is installable in the image forming apparatus depicted in FIG. 1, illustrating the lateral end span of the fixing belt incorporated in the fixing device in the longitudinal direction of the fixing belt.

Subsequently, FIG. 15 illustrates a construction of a fixing device 20B according to a third embodiment of the present disclosure.

As illustrated in FIG. 15, the fixing device 20B according to the third embodiment includes a heat shield 31B including a first portion 34B, a second portion 35B, a bent portion 36B, and a reflection face 31*a*B. The reflection face 31*a*B is disposed opposite the halogen heater 23. The second portion 35B of the heat shield 31B is curved in cross section unlike the second portion 35A of the heat shield 31A depicted in FIG. 13 that is linear in cross section. Thus, the second portion 35B may have a shape not limited to a linear shape in cross section and may have a curved shape in cross section.

The heat shield 31B according to the third embodiment depicted in FIG. 15 also includes the second portion 35B that is extended toward the lateral edge portion of the fixing belt 21 in the longitudinal direction X thereof and is separated from the belt holder 27 gradually. Accordingly, the heat shield 31B suppresses heat conduction from the heat shield 31B to the belt holder 27, suppressing temperature increase of the belt holder 27. Consequently, the heat shield 31B suppresses generation of the FP/UFP from the lubricant adhered to the belt holder 27.

The heat shield 31B according to the third embodiment also includes the second portion 35B having an inner face 35*a*B that is disposed opposite the halogen heater 23. The inner face 35*a*B is inclined and directed to the center span of the fixing belt 21 in the longitudinal direction X thereof. For example, the inner face 35*a*B is directed rightward in FIG. 15. Hence, the second portion 35B reflects a part of radiant heat emitted from the halogen heater 23 toward the center span of the fixing belt 21 in the longitudinal direction X thereof. Thus, the heat shield 31B facilitates heating of the fixing belt 21 and improves energy saving. Additionally, the second portion 35B reflects radiant heat emitted by the halogen heater 23 toward the center span of the fixing belt 21 in the longitudinal direction X thereof, suppressing temperature increase of the heat shield 31B. Thus, the heat shield 31B is immune from thermal deformation and suppresses temperature increase of the belt holder 27 also, that may be caused by temperature increase of the heat shield 31B.

The above describes the embodiments of the present disclosure. However, application of the technology of the present disclosure is not limited to the fixing devices 20, 20A, and 20B having the constructions described above, respectively. The technology of the present disclosure is also applied to fixing devices having other constructions. The following describes constructions of fixing devices applied with the technology of the present disclosure.

Figure 16:
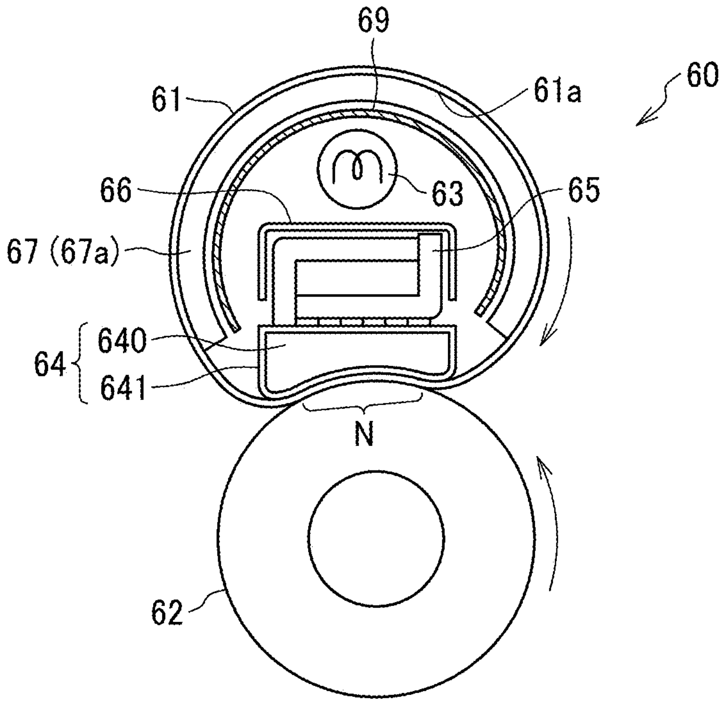
FIG. 16 is a cross-sectional view of a fixing device according to another embodiment of the present disclosure, that is installable in the image forming apparatus depicted in FIG. 1.
Figure 17:
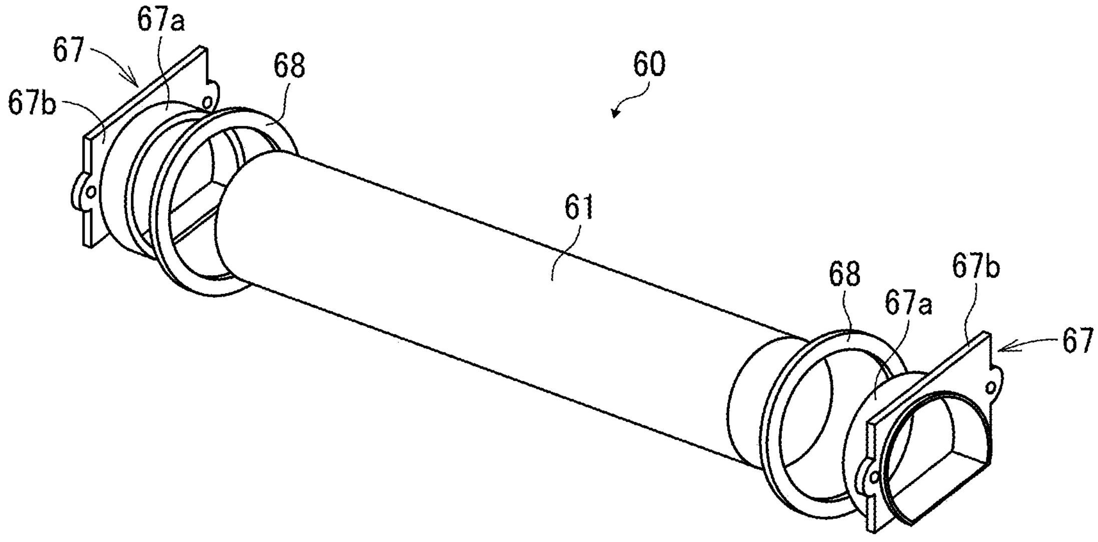
FIG. 17 is an exploded perspective view of the fixing device depicted in FIG. 16.

Referring to FIGS. 16 and 17, a description is provided of a construction of a fixing device 60 according to an embodiment of the present disclosure.

As illustrated in FIGS. 16 and 17, the fixing device 60 includes a fixing belt 61 serving as a first rotator, a rotator, or an endless belt, a pressure roller 62 serving as a second rotator, a halogen heater 63 serving as a heater or a heat source, a nip formation pad 64, a support 65, a reflection plate 66 serving as a reflector, a heat shield 69, holding frames 67 serving as rotator holders, and rings 68 serving as slide aids.

The fixing belt 61, the pressure roller 62, the halogen heater 63, the nip formation pad 64, the support 65, the reflection plate 66, the heat shield 69, and the holding frames 67 depicted in FIGS. 16 and 17 have functions and constructions that are basically equivalent to those of the fixing belt 21, the pressure roller 22, the halogen heater 23, the nip formation pad 24, the stay 25, the reflector 26, the heat shield 31, and the belt holders 27 depicted in FIGS. 2, 3, and 4, respectively. The nip formation pad 64 includes a base pad 640 that is made of metal and a slide sheet 641 that is interposed between the base pad 640 and an inner circumferential face 61*a* of the fixing belt 61 and is made of fluororesin.

Each of the holding frames 67 includes a tube 67*a* and a securing plate 67*b*. The ring 68 is attached to an outer circumferential face of the tube 67*a* that serves as an insertion portion of the holding frame 67 and is inserted into a loop formed by the fixing belt 61. The ring 68 is interposed between a lateral edge of the fixing belt 61 in a longitudinal direction thereof and the securing plate 67*b* serving as a restrictor of the holding frame 67. As the fixing belt 61 rotates, the rings 68 rotate in accordance with rotation of the fixing belt 61 or the fixing belt 61 slides over the rings 68 having low friction, thus decreasing sliding friction that generates between the fixing belt 61 and the holding frames 67.

With the above-described construction of the fixing device 60 also, as the halogen heater 63 emits radiant heat and the radiant heat increases the temperature of the heat shield 69, the holding frame 67 may be affected by temperature increase of the heat shield 69 and may suffer from temperature increase. Accordingly, the lubricant adhered to the holding frame 67 may generate the FP/UFP. To address the circumstance, the fixing device 60 depicted in FIGS. 16 and 17 is also applied with the technology of the present disclosure. For example, the heat shield 69 is separated from the holding frame 67 with an increased clearance therebetween, suppressing temperature increase of the holding frame 67 and generation of the FP/UFP.

A description is provided of a construction of a fixing device 70 according to an embodiment of the present disclosure.

Figure 18:
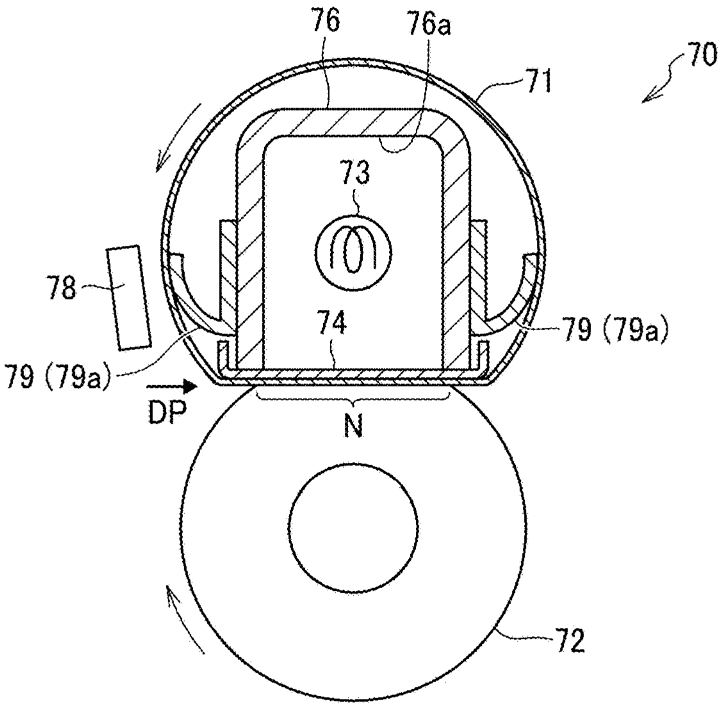
FIG. 18 is a cross-sectional view of a fixing device according to yet another embodiment of the present disclosure, that is installable in the image forming apparatus depicted in FIG. 1.
Figure 19:
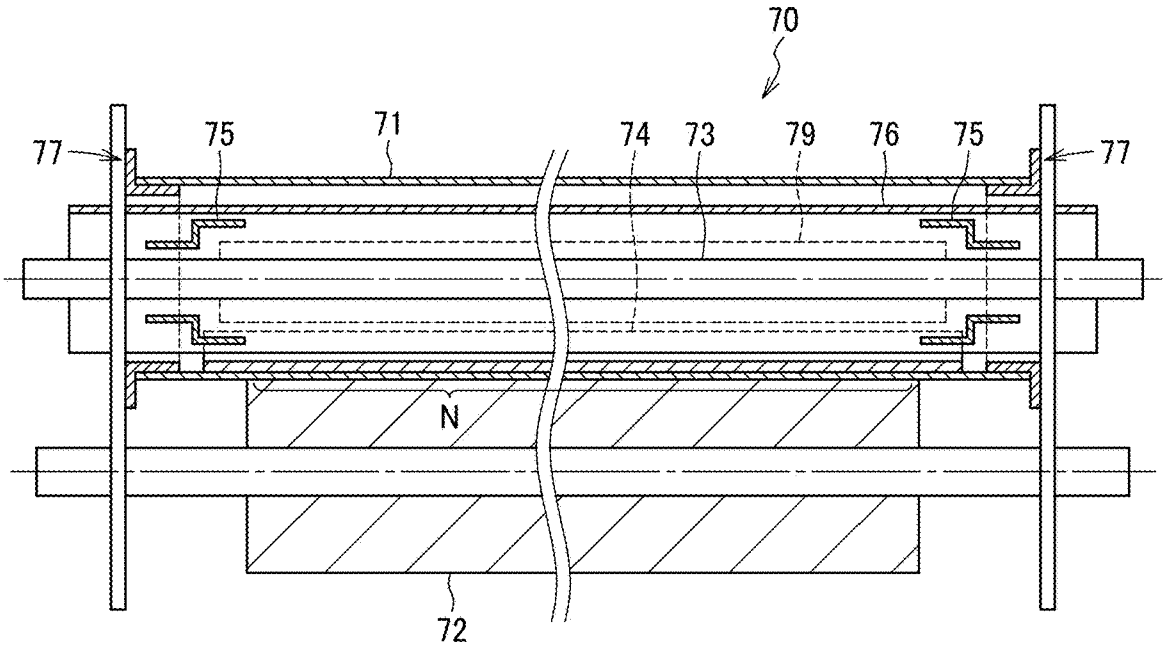
FIG. 19 is a cross-sectional view of the fixing device depicted in FIG. 18, taken along a longitudinal direction of a fixing belt incorporated in the fixing device.

As illustrated in FIGS. 18 and 19, the fixing device 70 includes a fixing belt 71 serving as a first rotator, a rotator, or an endless belt, a pressure roller 72 serving as a second rotator, a halogen heater 73 serving as a heater or a heat source, a nip formation pad 74, heat shields 75 depicted in FIG. 19, a reflector 76, belt supports 77 serving as rotator holders depicted in FIG. 19, a temperature sensor 78 serving as a temperature detector, and guides 79.

The fixing belt 71, the pressure roller 72, the halogen heater 73, the nip formation pad 74, the heat shield 75, the reflector 76, the belt support 77, and the temperature sensor 78 depicted in FIGS. 18 and 19 have functions that are basically equivalent to those of the fixing belt 21, the pressure roller 22, the halogen heater 23, the nip formation pad 24, the heat shield 31, the reflector 26, the belt holder 27, and the temperature sensor 28 depicted in FIGS. 2, 3, and 4, respectively.

The reflector 76 depicted in FIGS. 18 and 19 reflects radiant heat (e.g., infrared light) emitted from the halogen heater 73 toward the nip formation pad 74 mainly, not the fixing belt 71. The reflector 76 is U-shaped in cross section to cover an outer circumferential face of the halogen heater 73. The reflector 76 includes an inner face 76*a* that is disposed opposite the halogen heater 73 and serves as a reflection face having an enhanced reflectance. Accordingly, as the halogen heater 73 emits radiant heat, the inner face 76*a* of the reflector 76 reflects the radiant heat toward the nip formation pad 74.

Thus, the nip formation pad 74 is heated by the radiant heat emitted by the halogen heater 73 toward the nip formation pad 74 and the radiant heat reflected by the reflector 76 toward the nip formation pad 74. The nip formation pad 74 conducts heat to the fixing belt 71 at the fixing nip N. The nip formation pad 74 forms the fixing nip N. Additionally, the nip formation pad 74 serves as a thermal conductor that conducts heat to the fixing belt 71 at the fixing nip N. Hence, the nip formation pad 74 is made of a metal material having an enhanced thermal conductivity, such as copper and aluminum.

The reflector 76 also serves as a support (e.g., a stay) that supports the nip formation pad 74. The reflector 76 supports the nip formation pad 74 throughout an entire span of the fixing belt 71 in a longitudinal direction thereof, suppressing a bend of the nip formation pad 74. Accordingly, the fixing nip N, having an even width in the sheet conveyance direction DP throughout the entire span of the fixing belt 71 in the longitudinal direction thereof, is formed between the fixing belt 71 and the pressure roller 72. In order to achieve a function of the reflector 76 as the support, the reflector 76 is preferably made of a metal material having an enhanced rigidity such as SUS and SECC.

The guides 79 are disposed within a loop formed by the fixing belt 71. The guides 79 contact an inner circumferential face of the fixing belt 71 and guide the fixing belt 71 that rotates. Each of the guides 79 includes a guide face 79*a* that is curved along the inner circumferential face of the fixing belt 71. As each of the guides 79 guides the fixing belt 71 along the guide face 79*a*, the fixing belt 71 rotates smoothly without substantial deformation.

With the above-described construction of the fixing device 70 also, as the halogen heater 73 emits radiant heat and the radiant heat increases the temperature of the heat shield 75, the belt support 77 may be affected by temperature increase of the heat shield 75 and may suffer from temperature increase. Accordingly, the lubricant adhered to the belt support 77 may generate the FP/UFP. To address the circumstance, the fixing device 70 depicted in FIGS. 18 and 19 is also applied with the technology of the present disclosure. Thus, the heat shield 75 is separated from the belt support 77 with an increased clearance therebetween as illustrated in FIG. 19. Accordingly, the heat shield 75 suppresses temperature increase of the belt support 77, suppressing generation of the FP/UFP.

Application of the technology of the present disclosure is not limited to a fixing device (e.g., the fixing devices 20, 20A, 20B. 60, and 70) installed in an image forming apparatus (e.g., the image forming apparatus 100) that forms an image by electrophotography as described above. For example, the technology of the present disclosure is also applied to a heating device other than the fixing device, that is installed in an image forming apparatus employing an inkjet method. The heating device includes a dryer that dries liquid such as ink applied on a sheet.

Figure 20:
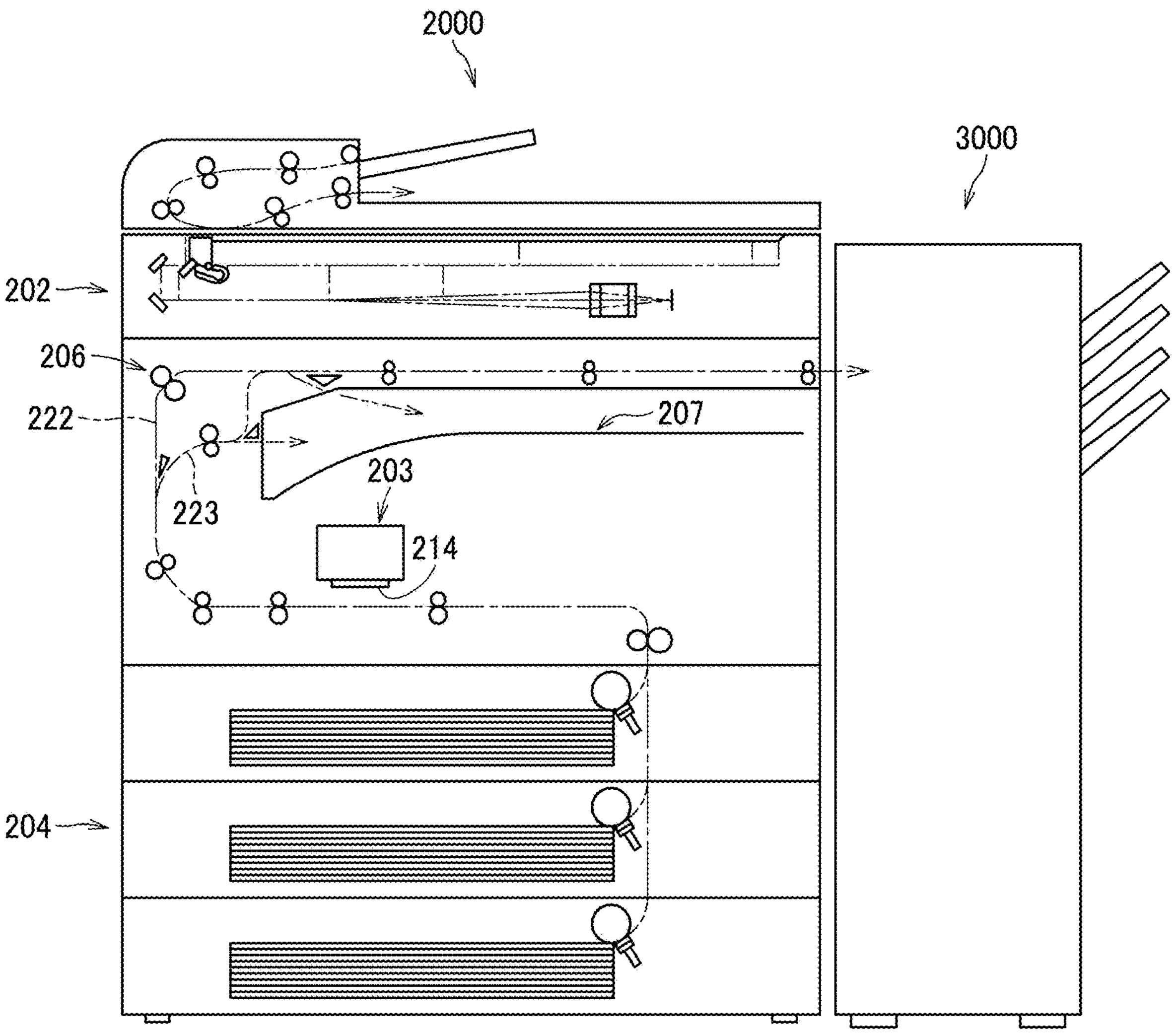
FIG. 20 is a cross-sectional view of an inkjet image forming apparatus according to an embodiment of the present disclosure, that incorporates a dryer.

FIG. 20 illustrates an inkjet image forming apparatus 2000 according to an embodiment of the present disclosure, that incorporates a dryer 206.

As illustrated in FIG. 20, the inkjet image forming apparatus 2000 includes a scanner 202, an image forming device 203, a sheet supply 204, the dryer 206, and a sheet output device 207. A sheet aligner 3000 (e.g., a finisher) is disposed beside the inkjet image forming apparatus 2000.

When the inkjet image forming apparatus 2000 receives an instruction to start printing, the sheet supply 204 supplies a sheet (e.g., paper) serving as a recording medium. When the sheet is conveyed to the image forming device 203, a liquid discharge head 214 of the image forming device 203 discharges ink onto the sheet according to image data created by the scanner 202 that reads an image on an original or image data (e.g., print data) sent from a terminal, thus forming an image on the sheet.

The sheet bearing the image is selectively guided to a conveyance path 222 provided with the dryer 206 or a conveyance path 223 not provided with the dryer 206. If the sheet is guided to the dryer 206, the dryer 206 facilitates drying of ink on the sheet. The sheet is guided to the sheet output device 207 or the sheet aligner 3000. Conversely, if the sheet is guided to the conveyance path 223 not provided with the dryer 206, the sheet is guided to the sheet output device 207 or the sheet aligner 3000 without being dried by the dryer 206. If the sheet is guided to the sheet aligner 3000, the sheet aligner 3000 aligns the sheet and places the sheet on a tray.

Figure 21:
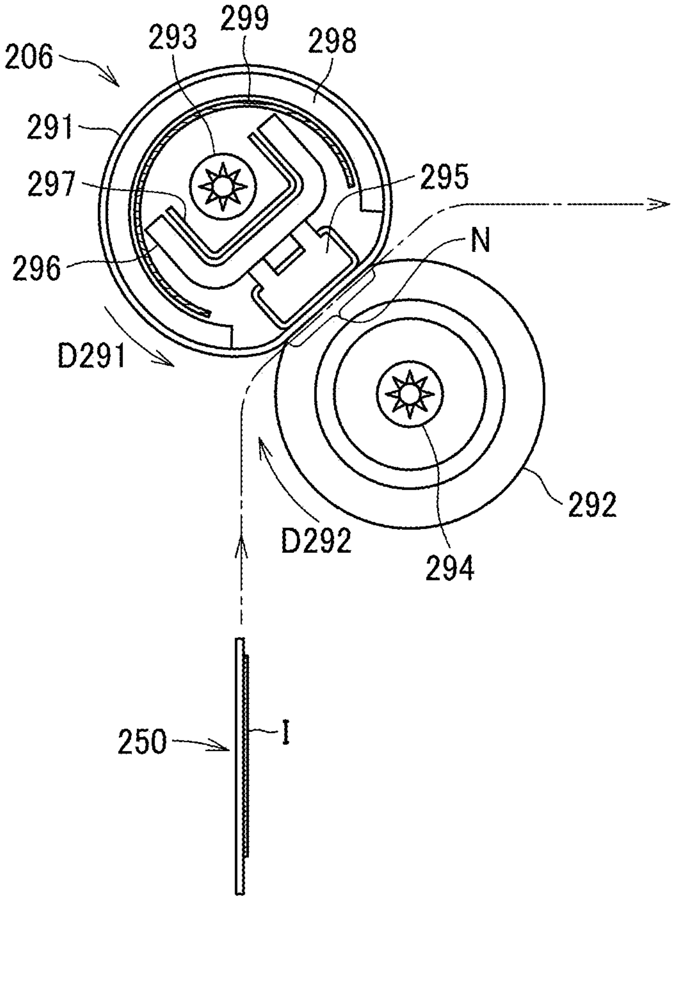
FIG. 21 is a cross-sectional view of the dryer incorporated in the inkjet image forming apparatus depicted in FIG. 20.

As illustrated in FIG. 21, the dryer 206 serving as a heating device includes a heating belt 291 serving as a first rotator, a rotator, or an endless belt, a heating roller 292 serving as a second rotator, a first halogen heater 293 serving as a heater or a heat source that heats the heating belt 291, a second halogen heater 294 serving as a heater or a heat source that heats the heating roller 292, a nip formation pad 295, a stay 296 serving as a support, a reflector 297, a heat shield 299, and a belt holder 298 serving as a rotator holder that rotatably holds the heating belt 291.

The nip formation pad 295 presses against an outer circumferential face of the heating roller 292 via the heating belt 291, forming the fixing nip N between the heating belt 291 and the heating roller 292. As illustrated in FIG. 21, as a sheet 250 bearing an image, that is, ink I, is conveyed through the fixing nip N of the dryer 206, the heating belt 291 that rotates in a rotation direction D291 and the heating roller 292 that rotates in a rotation direction D292 heat the sheet 250 while conveying the sheet 250. Thus, the dryer 206 facilitates drying of the ink I on the sheet 250.

In the dryer 206 depicted in FIG. 21, as the first halogen heater 293 emits radiant heat and the radiant heat increases the temperature of the heat shield 299, the belt holder 298 may be affected by temperature increase of the heat shield 299 and may suffer from temperature increase. Accordingly, the lubricant adhered to the belt holder 298 may generate the FP/UFP. To address the circumstance, the dryer 206 is also applied with the technology of the present disclosure. Thus, the heat shield 299 is separated from the belt holder 298 with an increased clearance therebetween. Accordingly, the heat shield 299 suppresses temperature increase of the belt holder 298, suppressing generation of the FP/UFP.

Figure 22:
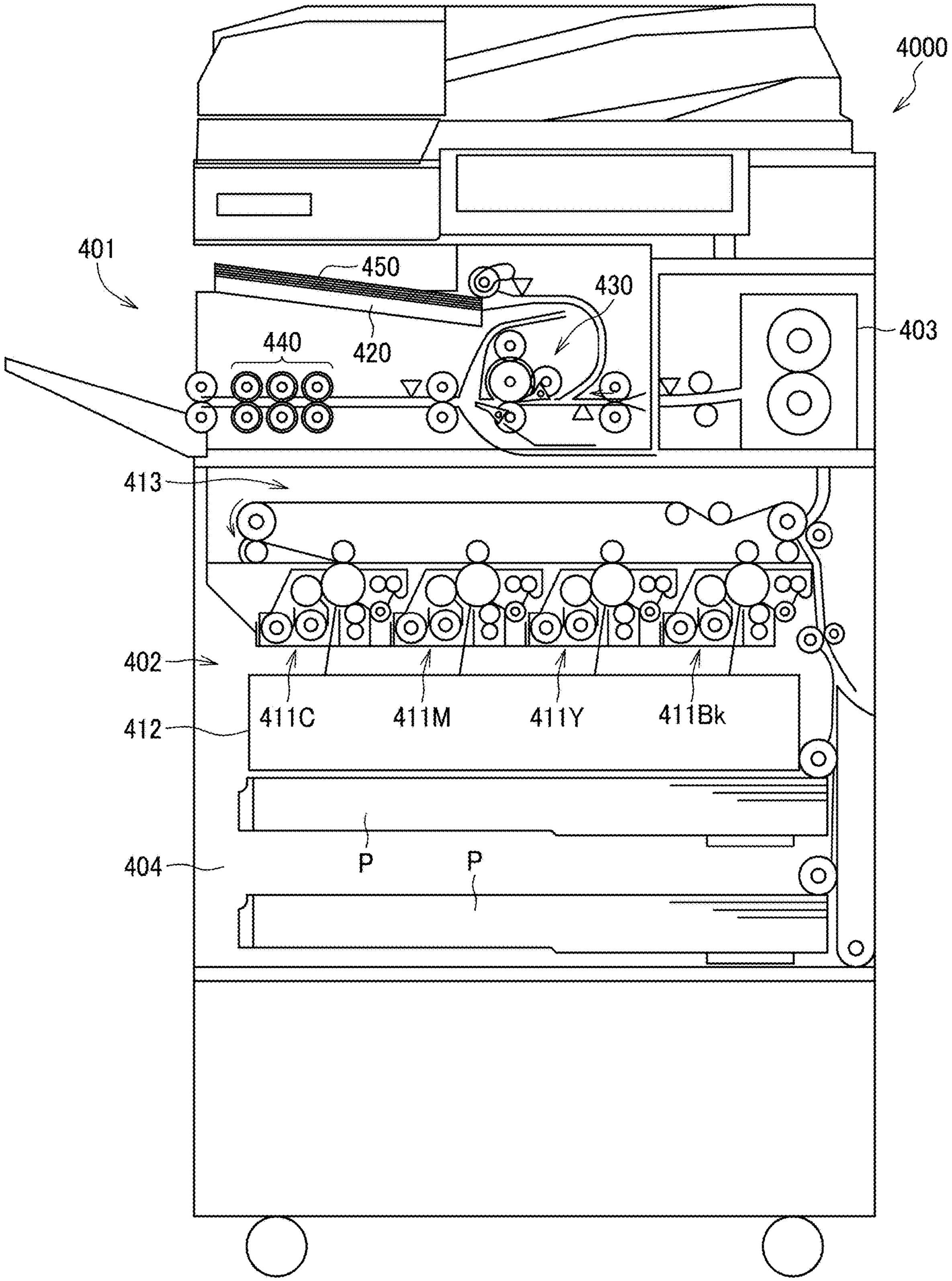
FIG. 22 is a cross-sectional view of an image forming apparatus according to another embodiment of the present disclosure, that incorporates a laminator.

The technology of the present disclosure is also applied to an image forming apparatus 4000 including a laminator 401 illustrated in FIG. 22.

As illustrated in FIG. 22, the image forming apparatus 4000 includes, in addition to the laminator 401, an image forming device 402 including a plurality of image forming units 411C, 411M, 411Y, and 411Bk, an exposure device 412, and a transfer device 413, a fixing device 403, and a sheet feeder 404 serving as a recording medium supply.

The laminator 401 serves as a heating device that heats and presses a sheet P inserted into a gap between two sheets and sandwiched between the two sheets, thus bonding the sheets by thermocompression. For example, the laminator 401 includes a sheet supply 420, a sheet peeler 430, and thermal pressure rollers 440. The sheet supply 420 supplies sheets 450. The sheet peeler 430 peels the sheets 450 supplied from the sheet supply 420 into two sheets 450. Each of the thermal pressure rollers 440 serves as a rotator that conveys the sheet P and the sheets 450 while heating and pressing the sheet P and the sheets 450 in a state in which the sheet P is inserted into a gap between the two peeled sheets 450. The laminator 401 further includes a heater or a heat source such as a halogen heater that emits infrared light and heats the thermal pressure roller 440. The laminator 401 further includes a pair of bearings serving as a pair of rotator holders that rotatably holds both lateral ends of the thermal pressure roller 440 in a longitudinal direction thereof, respectively.

In the image forming apparatus 4000 depicted in FIG. 22, as the sheet feeder 404 supplies a sheet P serving as a recording medium to the image forming device 402, the image forming device 402 forms an image and transfers the image onto the sheet P supplied from the sheet feeder 404. The sheet P transferred with the image is conveyed to the fixing device 403 that fixes the image on the sheet P. Image forming operation and transfer operation of the image forming device 402 (e.g., operation of the image forming units 411C, 411M, 411Y, and 411Bk, the exposure device 412, and the transfer device 413) and fixing operation of the fixing device 403 are basically equivalent to those according to the embodiments described above. Therefore, a description of the image forming operation, the transfer operation, and the fixing operation is omitted.

The sheet P bearing the fixed image is conveyed to the laminator 401 and is inserted into the gap between the two sheets 450 that are peeled. The thermal pressure rollers 440 heat and press the sheets 450 and the sheet P sandwiched between the two sheets 450, thus bonding the sheets 450 and the sheet P by thermocompression. The sheet P bonded with the sheets 450 is ejected to an outside of the image forming apparatus 4000.

If the rotator holder that rotatably holds the thermal pressure roller 440 is affected by temperature increase of a heat shield disposed inside the thermal pressure roller 440 and suffers from temperature increase, the lubricant adhered to the rotator holder may generate the FP/UFP. To address the circumstance, the laminator 401 incorporating the thermal pressure rollers 440 is also applied with the technology of the present disclosure, suppressing generation of the FP/UFP.

As described above, according to the embodiments of the present disclosure, a heat shield (e.g., the heat shields 31, 31A, 31B, 69, 75, and 299) suppresses temperature increase of a rotator holder (e.g., the belt holders 27 and 298, the holding frame 67, the belt support 77, and the bearing), suppressing generation of the FP/UFP from the lubricant adhered to the rotator holder. According to the embodiments of the present disclosure described above, fluorine grease, fluorine oil, silicone grease, or silicone oil is mentioned as a substance that generates the FP/UFP as one example. Alternatively, the technology of the present disclosure is also applied to the rotator holder adhered with a lubricating substance (e.g., a substance having lubricity) that is liquid or semisolid and is used as the substance that generates the FP/UFP. The lubricating substance (e.g., the substance having lubricity) denotes a substance that is interposed between parts and decreases frictional resistance between the parts. Even if the lubricating substance that is liquid or semisolid and is other than fluorine grease, fluorine oil, silicone grease, and silicone oil is adhered to the rotator holder, the heat shield according to the embodiments of the present disclosure suppresses temperature increase of the rotator holder, also suppressing temperature increase of the lubricating substance adhered to the rotator holder. Thus, the heat shield suppresses generation of the FP/UFP effectively.

The technology of the present disclosure encompasses at least a heating device, a fixing device, and an image forming apparatus that have configurations below.

A description is provided of a first configuration of the heating device (e.g., the fixing devices 20, 20A, 20B, 60, and 70, the dryer 206, and the laminator 401).

As illustrated in FIGS. 4, 13, and 15, the heating device includes a rotator (e.g., the fixing belts 21, 61, and 71, the heating belt 291, and the thermal pressure roller 440), a heater (e.g., the halogen heaters 23, 63, and 73 and the first halogen heater 293), a rotator holder (e.g., the belt holders 27 and 298, the holding frame 67, and the belt support 77), and a heat shield (e.g., the heat shields 31, 31A, 31B, 69, 75, and 299).

The rotator is rotatably held by the rotator holder. The heater is disposed opposite an inner circumferential face (e.g., the inner circumferential faces 21*a* and 61*a*) of the rotator. The heater heats the rotator. The rotator holder is disposed opposite the inner circumferential face of the rotator and holds a lateral end of the rotator in a longitudinal direction (e.g., the longitudinal direction X) thereof. The heat shield is disposed between the heater and the rotator and between the heater and the rotator holder. The heat shield blocks radiant heat radiated from the heater. The rotator holder is adhered with a lubricating substance that is liquid or semisolid. The heat shield does not contact the rotator holder. That is, the heat shield is separated from the rotator holder. The heat shield includes a first portion (e.g., the first portions 34, 34A, and 34B) and a second portion (e.g., the second portions 35, 35A, and 35B). The first portion is disposed closer to a center of the rotator in the longitudinal direction thereof than the second portion is. The second portion is disposed closer to a lateral end of the rotator in the longitudinal direction thereof than the first portion is and is disposed outboard from the first portion in the longitudinal direction of the rotator. The second portion is separated from the inner circumferential face of the rotator farther than the first portion is.

A description is provided of a second configuration of the heating device.

With the first configuration of the heating device, the first portion extends in the longitudinal direction of the rotator. The heat shield further includes a bent portion (e.g., the bent portions 36, 36A, and 36B) that is interposed between the first portion and the second portion. The second portion extends substantially in the longitudinal direction of the rotator and abuts on the bent portion. The second portion extends from the first portion through the bent portion. The second portion is separated gradually from the inner circumferential face of the rotator toward the lateral end of the rotator in the longitudinal direction thereof.

A description is provided of a third configuration of the heating device.

With the second configuration of the heating device, the bent portion is disposed outboard from a maximum recording medium conveyance span (e.g., the maximum sheet conveyance span W) in the longitudinal direction of the rotator. A recording medium (e.g., the sheet P) having a maximum size available in the heating device is conveyed in the maximum recording medium conveyance span.

A description is provided of a fourth configuration of the heating device.

With the second configuration or the third configuration of the heating device, the second portion is disposed closer to the heater than the first portion is. The heater includes a decreased heat generation portion (e.g., the decreased heat generation portion G) that generates heat in a decreased heat generation amount that is not greater than 50% of a maximum heat generation amount of the heater. The second portion is disposed opposite the decreased heat generation portion.

A description is provided of a fifth configuration of the heating device.

With any one of the first configuration to the fourth configuration of the heating device, the heat shield has a heater opposed face (e.g., the reflection faces 31*a*, 31*a*A, and 31*a*B and the inner faces 35*a*A and 35*a*B) that is disposed opposite the heater and has a radiant heat reflectance not smaller than 40%.

A description is provided of a sixth configuration of the heating device.

With any one of the first configuration to the fifth configuration of the heating device, the heater opposed face (e.g., the inner faces 35*a*A and 35*a*B) of the heat shield is inclined and directed to a center span of the rotator in the longitudinal direction thereof.

A description is provided of a seventh configuration of the heating device.

With any one of the first configuration to the sixth configuration of the heating device, the heating device further includes a stay (e.g., the stay 25) to which the heat shield is secured stationarily such that the heat shield does not move.

A description is provided of an eighth configuration of a fixing device (e.g., the fixing devices 20, 20A, 20B, 60, 70, and 403).

With any one of the first configuration to the seventh configuration of the heating device, the fixing device heats a recording medium (e.g., the sheet P) bearing an unfixed image, thus fixing the unfixed image on the recording medium.

A description is provided of a ninth configuration of an image forming apparatus (e.g., the image forming apparatuses 100 and 4000 and the inkjet image forming apparatus 2000).

The image forming apparatus includes the heating device having any one of the first configuration to the seventh configuration or the fixing device having the eighth configuration.

Accordingly, the heating device, the fixing device, and the image forming apparatus suppress generation of fine particles.

According to the embodiments described above, the fixing belt 21 serves as a rotator or a first rotator. Alternatively, a fixing film, a fixing sleeve, or the like may be used as a rotator or a first rotator. Further, the pressure roller 22 serves as a second rotator. Alternatively, a pressure belt or the like may be used as a second rotator.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a rotator configured to rotate;

a heater disposed opposite an inner circumferential face of the rotator, the heater configured to heat the rotator;

a rotator holder disposed opposite the inner circumferential face of the rotator, the rotator holder configured to hold a lateral end of the rotator in a longitudinal direction of the rotator, the rotator holder adhered with a lubricating substance; and a heat shield disposed between the heater and the rotator and between the heater and the rotator holder, the heat shield configured to block radiant heat radiated from the heater, the heat shield separated from the rotator holder, the heat shield including:

a first portion; and a second portion disposed outboard from the first portion in the longitudinal direction of the rotator, the second portion separated from the inner circumferential face of the rotator farther than the first portion is, wherein the heat shield has a heater opposed face being disposed opposite the heater and having a radiant heat reflectance not smaller than 40%.

2. The heating device according to claim 1, wherein the lubricating substance is liquid.

3. The heating device according to claim 1, wherein the lubricating substance is semisolid.

4. The heating device according to claim 1, wherein the first portion of the heat shield is disposed closer to a center of the rotator in the longitudinal direction of the rotator than the second portion of the heat shield is.

5. The heating device according to claim 1, wherein the first portion of the heat shield extends in the longitudinal direction of the rotator, wherein the heat shield further includes a bent portion being interposed between the first portion and the second portion and abutting on the first portion, and wherein the second portion is separated gradually from the inner circumferential face of the rotator toward the lateral end of the rotator in the longitudinal direction of the rotator.

6. The heating device according to claim 5, wherein the bent portion of the heat shield is disposed outboard from a maximum recording medium conveyance span in the longitudinal direction of the rotator, and wherein a recording medium having a maximum size available in the heating device is conveyed in the maximum recording medium conveyance span.

7. The heating device according to claim 1, wherein the second portion of the heat shield is disposed closer to the heater than the first portion of the heat shield is, wherein the heater includes a decreased heat generation portion configured to generate heat in a decreased heat generation amount that is not greater than 50% of a maximum heat generation amount of the heater, and wherein the second portion of the heat shield is disposed opposite the decreased heat generation portion of the heater.

8. The heating device according to claim 1, wherein the heater opposed face of the heat shield is inclined, relative to the rotator, and directed to a center span of the rotator in the longitudinal direction of the rotator.

9. The heating device according to claim 1, further comprising:

a stay to which the heat shield is secured stationarily.

10. The heating device according to claim 1, wherein the second portion of the heat shield is linear in cross section.

11. The heating device according to claim 1, wherein the second portion of the heat shield is curved in cross section.

12. The heating device according to claim 1, wherein the rotator includes an endless belt.

13. A fixing device comprising:

the heating device according to claim 1; and another rotator disposed opposite the rotator of the heating device.

14. An image forming apparatus comprising:

the fixing device according to claim 13; and an image bearer to bear an image.

15. A heating device comprising:

a rotator configured to rotate;

a heater disposed opposite an inner circumferential face of the rotator, the heater configured to heat the rotator;

a rotator holder disposed opposite the inner circumferential face of the rotator, the rotator holder configured to hold a lateral end of the rotator in a longitudinal direction of the rotator, the rotator holder adhered with a lubricating substance; and a heat shield disposed between the heater and the rotator and between the heater and the rotator holder, the heat shield configured to block radiant heat radiated from the heater, the heat shield separated from the rotator holder, the heat shield including:

a first portion; and a second portion disposed outboard from the first portion in the longitudinal direction of the rotator, the second portion separated from the inner circumferential face of the rotator farther than the first portion is, wherein the second portion of the heat shield is L-shaped in cross section.

16. A fixing device comprising:

the heating device according to claim 15;

another rotator disposed opposite the rotator of the heating device.

17. An image forming apparatus comprising:

the fixing device according to claim 16; and an image bearer to bear an image.

* * * * *